(12) United States Patent
Wisniewski

(10) Patent No.: US 7,237,200 B2
(45) Date of Patent: Jun. 26, 2007

(54) SHARING, MANAGING AND COMMUNICATING INFORMATION OVER A COMPUTER NETWORK

(75) Inventor: Maciej Wisniewski, New York, NY (US)

(73) Assignee: Netomat, Inc., New York, NY (US)

( * ) Notice: Subject to any disclaimer, the term of this patent is extended or adjusted under 35 U.S.C. 154(b) by 649 days.

(21) Appl. No.: 10/100,813

(22) Filed: Mar. 18, 2002

(65) Prior Publication Data

US 2002/0178164 A1 Nov. 28, 2002

Related U.S. Application Data

(60) Provisional application No. 60/276,386, filed on Mar. 16, 2001.

(51) Int. Cl.
*G06F 17/00* (2006.01)

(52) U.S. Cl. .................... 715/751; 715/513; 715/500.1

(58) Field of Classification Search ................ 715/513, 715/751, 500.1
See application file for complete search history.

(56) References Cited

U.S. PATENT DOCUMENTS

| | | | |
|---|---|---|---|
| 5,689,641 A | 11/1997 | Ludwig et al. | |
| 5,802,294 A | 9/1998 | Ludwig et al. | |
| 5,818,447 A | 10/1998 | Wolf et al. | |
| 5,854,893 A | 12/1998 | Ludwig et al. | |
| 5,867,654 A | 2/1999 | Ludwig et al. | |
| 5,870,552 A | 2/1999 | Dozier et al. | 395/200.49 |
| 5,915,091 A | 6/1999 | Ludwig et al. | |
| 5,956,736 A * | 9/1999 | Hanson et al. | 715/513 |
| 5,978,835 A | 11/1999 | Ludwig et al. | |
| 6,014,677 A | 1/2000 | Hayashi et al. | 707/501 |
| 6,157,954 A | 12/2000 | Moon et al. | |
| 6,161,137 A | 12/2000 | Ogdon et al. | |

(Continued)

FOREIGN PATENT DOCUMENTS

EP 1 447 999 8/2004

(Continued)

OTHER PUBLICATIONS

Harvey, Michael G., et al, "Intranets and Organizational Learning", Proceedings of the 1997 ACM SIGCPR Conference on Computer Personnel Research, Apr. 1997, pp. 110-116.*

(Continued)

*Primary Examiner*—Heather R. Herndon
*Assistant Examiner*—L. Ries
(74) *Attorney, Agent, or Firm*—Mintz Levin Cohn Ferris Glovsky and Popeo, P.C.

(57) ABSTRACT

A egocentric network including an author, a document created by the author, the document for dissemination over a computer network, a recipient for receiving the document from the author, a first egocentric network monitor for presenting a visual and/or audio representation of a point of view of the author for the document and a point of involvement for the document, a second egocentric network monitor for presenting a visual and/or audio representation of a point of view of the recipient for the document and a point of involvement for the document, and a point of involvement for said document. In addition, methods and apparatuses for sharing and communicating information over a computer network are included.

24 Claims, 8 Drawing Sheets

U.S. PATENT DOCUMENTS

| | | |
|---|---|---|
| 6,216,158 B1 | 4/2001 | Luo et al. |
| 6,230,205 B1 | 5/2001 | Garrity et al. |
| 6,233,318 B1 | 5/2001 | Picard et al. |
| 6,237,025 B1 | 5/2001 | Ludwig et al. |
| 6,260,040 B1* | 7/2001 | Kauffman et al. ............ 707/10 |
| 6,266,683 B1 | 7/2001 | Yehuda et al. .............. 707/512 |
| 6,405,037 B1 | 6/2002 | Rossmann |
| 6,405,197 B2 | 6/2002 | Gilmour ........................ 707/5 |
| 6,473,794 B1* | 10/2002 | Guheen et al. ............. 709/223 |
| 6,560,639 B1* | 5/2003 | Dan et al. ................... 709/218 |
| 6,584,480 B1* | 6/2003 | Ferrel et al. ................ 715/513 |
| 6,601,057 B1* | 7/2003 | Underwood et al. ........... 707/1 |
| 6,636,733 B1 | 10/2003 | Helferich |
| 6,643,663 B1* | 11/2003 | Dabney et al. ............. 707/102 |
| 6,748,569 B1* | 6/2004 | Brooke et al. .............. 715/523 |
| 2001/0001855 A1 | 5/2001 | Ziamo |
| 2002/0010626 A1* | 1/2002 | Agmoni ........................ 705/14 |
| 2002/0099777 A1* | 7/2002 | Gupta et al. ................ 709/206 |
| 2003/0054810 A1 | 3/2003 | Chen et al. |
| 2003/0061307 A1 | 3/2003 | Daswani et al. |
| 2003/0194990 A1 | 10/2003 | Helferich |
| 2003/0202641 A1 | 10/2003 | Huang |
| 2003/0204568 A1 | 10/2003 | Bhargava et al. |
| 2003/0214529 A1 | 11/2003 | Martin et al. |
| 2004/0006551 A1 | 1/2004 | Sahinoja et al. |
| 2004/0024846 A1 | 2/2004 | Randall et al. |
| 2004/0032495 A1 | 2/2004 | Ortiz |
| 2004/0107254 A1* | 6/2004 | Ludwig et al. ............. 709/204 |
| 2004/0193694 A1* | 9/2004 | Salo et al. .................. 709/216 |
| 2004/0205358 A1* | 10/2004 | Erickson ..................... 713/200 |

FOREIGN PATENT DOCUMENTS

| | | |
|---|---|---|
| WO | WO 03/085599 | 10/2003 |

OTHER PUBLICATIONS

Abrams, David, et al, "Information Archiving With Bookmarks: Personal Web Space Construction and Organization", Proceedings of the SIGCHI Conference on Human Factors in Computing Systems, Jan. 1998, pp. 41-48.*

PCT International Search Report dated Aug. 6, 2002.

Wiegel, Burkhard (1996) "Secure External References in Multimedia Email Messages." CCS pp. 11-18.

Copy of International Search Report, PCT Appl. No. US2005/033936.

* cited by examiner

SHARING, MANAGING AND COMMUNICATING INFORMATION OVER A COMPUTER NETWORK

This application claims benefit under 35 U.S.C. §119(e) of the filing date of U.S. Provisional Application No. 60/276,386 filed Mar. 16, 2001; the entire disclosure of which is incorporated herein by reference.

BACKGROUND OF THE INVENTION

1. Field Of The Invention

The invention relates to the field of information networks, information gathering, altering and sharing, and more particularly, the invention relates to techniques for the assembly and arrangement of multiple format information into a work for forwarding to third parties and publishing to on a computer network.

2. Background of Related Prior Art

Electronic Mail (E-mail) and other messaging systems provide a means for sending electronic messages from one computer user to another. E-mail has advantages of convenience, format and storage of messages for later retrieval. As such, E-mail has been accepted and widely used for basic communication. E-mail is typically a text based format, however, and proves to be very limiting for the communication of complex documents, such as reports, articles, advertisements, images, audio and video.

E-mail systems do provide a means for distributing images, audio and video information by appending to a text based E-mail message with an associated file to be downloaded along with the E-mail message. However, such rich media files tend to be too large to be downloaded efficiently. Moreover, most systems that allow the appending of an associated file are designed to allow a single user to send unsecured files to an associate or friend, and neither allow for controlled automated distribution to multiple recipients, nor do they provide advanced accounting, billing or other such features (e.g., receipt notification). E-mail gateways also limit the size and applicability of attachments, and do not solve the problems of security and receipt notation or acknowledgment.

Within the past decade, the Internet, corporate intranets and personal computers have become full of rich media content including pictures, music, animation, and video. If a person wishes to communicate using any combination of this rich media, it is a laborious process. Each piece of information must be integrated into a user's e-mail as a separate attachment. These attachments are usually large files having disparate formats. A recipient of an e-mail message with attached rich media files must download each of these large attachments individually and then hope to have the appropriate applications or plug-ins to view each of the attachments.

SUMMARY OF THE INVENTION

The present invention includes authoring and communicating methods and apparatuses for disseminating and managing information over a computer network to be viewed on a networked device (e.g., client computer, PDA, cell phone, and the like) via a distribution channel (e.g., email, instant messaging, web page). The information may be presented using a "just-in-time" application or an "application on the fly". The author composes an authored work to which different information is assembled for viewing and editing, interacting, updating and like. The information may include images, sounds, video, graphics and/or text. The information may be formatted so that when presented, it is displayed in a predetermined manner (e.g., sequenced like a Microsoft Powerpoint presentation) or at the control of the recipient.

After the author has assembled the work, it is compiled, creating a just-in-time application (netomatic application), so that code essential to the creation or invoking of an application for presenting the work (for example: media player, sequencer, audio player), and/or code that is necessary for being presented with the work (i.e., search engine, downstream authoring, instant messaging) is included with the code which details the presentation.

The compiled code includes the essential code for presenting the information (e.g., document) on the recipient's computer. Alternatively, the code may prompt the recipient's computer to download or execute the appropriate application software to present the information. Thus, the presentation preferably includes code elements for creating or invoking an application and for displaying the information to either check to see if the networked device includes a media player (e.g., Windows media, Real media player, etc.), and if so, then invoking the media player to play the information upon the displaying of the presentation (e.g., the opening of an email, the displaying of a banner ad). Alternatively, the networked device may have a netomatic application resident (thus having the particular application elements for presenting a NML document), then all the necessary components will be there to display the presentation.

Any information originating from the authoring computer (video, images, sound) included in the presentation may be uploaded to a server or stored locally at the author's computer, and an external reference to the information is included in the formatted code. Any information which does not originate from the authoring computer will be included by reference in the presentation, and will be included by reference in the compiled code.

The compiled code is then forwarded to a distribution channel for viewing over a networked device. A distribution channel may be a web page, an email, an instant messaging application, a wireless device, or an advertisement banner.

Upon displaying the presentation on a networked device, the information is then retrieved directly from the server from which it resides (either information uploaded to the netomat server or other information stored on other servers of the network). Thus, if the distribution channel is an email, then the essential material in the email is merely the code for creating/invoking the application necessary to display and be presented with the presentation, and code (external reference) for obtaining the information to display during the presentation, resulting in a small file size of the email (e.g., a video presentation email being only 10k in size).

With this idea, aside from including code to create/invoke the application for displaying the presentation, the author may include code for creating/invoking an instant messaging application, a search engine, an annotating tool set (downstream authoring), etc.

Moreover, the present invention is directed to self-managed, and self-created networks (i.e., self-empowered networks) in which popular information is multiplied throughout the network and non-popular information is not. Thus, it is not a problem in determining by a network administrator how much space a document will be entitled to hold on a server, but rather, if the information is popular, its popularity will then determine such space.

The self-empowered, egocentric network thus allows the creator of the information to control access from a single message, to open public access available to web search engines. In effect, a new egocentric network is created for each new document created or edited by an author.

Moreover, the author is always in control of the information which is externally referenced by the NML document. Specifically, another embodiment of the present invention provides for the control of information over a computer network by an author; i.e., an "egocentric" network. Essentially, in the above authoring embodiment, once the author has uploaded the compiled code and information onto the server (i.e., the netomat server), the compiled code and information includes methods and apparatuses which can control who may access the presentation/information and how it may be accessed. The author may also continually update information contained within his created NML document. Thus, any recipient viewing the NML document to which the author has changed the information contained therein (after the document has been sent) will be presented with the updated information upon viewing the document.

Moreover, the methods and apparatuses according to this embodiment may also tell the author who has accessed the information and how many times the information has been accessed. For example, if a presentation is forwarded through email to a friend of the author, the author can invoke certain rules to limit access to the presentation/information to certain individuals, a certain number of times, etc. The author may also publish the information generally, such that anyone receiving the email (i.e., being forwarded by the original receiving party and subsequent others) can access the information, and that search engines (web crawlers) can find the information for others to access.

In yet another embodiment of the present invention, netomatic markup language (NML), a unique application of extensible markup language (XML) is provided. The code is similar to XML (see the World Wide Web Consortium, Extensible Markup Language (XML) 1.0 specification, 2nd edition Oct. 6, 2000, herein incorporated by reference), but has different, unique semantics. Specifically, the language allows one to create a small file size document that is preferably text based, which contains within the very document itself the information to be communicated, the means of communicating the information (transport), who may create or change the information (authoring), who may view the information (messaging) and how the document may be viewed (presentation). Other computer languages (HTML, XML, SOAP, SMTP) specify solely how the information may look (HTML)<how it is structured (XML), and how it may be transported (SOAP, SMTP). NML allows a single document to specify all of these layers. Accordingly, NML provides a way which allows for the authoring, messaging, and presentation methods and apparatuses briefly described above, as well as the egocentric network.

Accordingly, in a first aspect of the present invention, a method of communicating information includes authoring a document in a code for presenting information contained within the document in a predetermined manner on a networked device. The code comprises specific code for communicating the document over a computer network, code for controlling who may create and/or change the information contained in the document, code for controlling who may view the information contained within the document and code for how the document is presented on a networked device. The method further includes disseminating the document through a computer network, either by uploading the document to a server or by making the document available through peer-to-peer networking, and forwarding the document to a distribution channel for presenting the document on the networked device. When the document arrives at the distribution channel, the code creates or invokes a first application for presenting the document in a predetermined manner.

The above aspect may also include code which also creates or invokes a second application for being presented with the document. Such a second application may be a downstream authoring tool.

In another aspect of the present invention, a method of communicating information includes formatting a document in a code for presenting information contained within the document in a predetermined manner on a networked device and compiling the code into a file of compiled code such that a necessary element for creating or invoking a first application for presenting the document and/or for creating or invoking a second application for being presented with the document is included in the compiled code. The method further includes disseminating the file through a computer network, either by uploading the file to a server or by making the file available through peer to peer networking and forwarding the compiled code of the file to a distribution channel for presenting the document on the networked device. Upon the compiled code arriving at the distribution channel, the necessary element creates or invokes the first application for presenting the document in the predetermined manner and/or creates or invokes the second application for being presented with the document.

The distribution channels may include any one or more of email, published web page, wireless device, banner advertisement and instant messaging application.

The first application may be an audio/video viewer for presenting the information contained within the document. Moreover, the second application may be an authoring tool for allowing a user at the client to annotate the document, may be an internet search engine, and an instant messaging application.

In another aspect of the present invention, a document for disseminating over a computer network having informational content and computer readable code comprising code for communicating the document over the computer network, code for controlling who may create and/or change the informational content, code for controlling who may view the informational content and code for how the document is presented on a networked device.

In yet another aspect of the present invention, an apparatus for communicating information includes formatting means for formatting a document in a code for presenting information contained within the document in a predetermined manner on a networked device, compiling means for compiling the code into a file of compiled code such that a necessary element for creating or invoking a first application for presenting the document and/or for creating or invoking a second application being presented with the document is included in the compiled code, disseminating means for disseminating the file through a computer network, either by uploading the file to a server or by making the file available through peer to peer networking, forwarding means for forwarding the compiled code of the file to a distribution channel for presenting the document on the networked device. Upon the compiled code arriving at the distribution channel, the necessary element creates or invokes the first application for presenting the document in the predetermined manner and/or creates or invokes the second application for being presented with the document.

In yet another aspect of the present invention, a method of communicating and controlling access to information includes formatting a document in a code for presenting information contained within the document in a predetermined manner in an email message upon the opening of the message, where the information is stored on a server and formatting the presentation includes using external references to the information. The method also includes compiling the code into a file of compiled code such that a necessary element for creating or invoking a first application for presenting the document and/or for creating or invoking a second application being presented with the document is included in the compiled code, disseminating the file through a computer network, either by uploading the file to a server or by making the file available through peer-to-peer networking, and forwarding the compiled code to a distribution channel for viewing on a networked device. Rules for accessing the file are specified by an author of the document and upon the compiled code arriving at the distribution channel, the necessary element creates or invokes the first application for presenting the document in the predetermined manner and/or creates or invokes the second application for being presented with the presentation.

In still yet another aspect of the present invention, an egocentric network includes an author, a document created by the author, the document for dissemination over a computer network, a recipient for receiving the document from the author, a first egocentric network monitor for presenting a visual and/or audio representation of a point of view of the author for the document and a point of involvement for the document, a second egocentric network monitor for presenting a visual and/or audio representation of a point of view of the recipient for the document and a point of involvement for the document, and a point of involvement for the document.

Other aspects of the present invention include:
- a banner advertisement displayed on a networked device comprising a compiled code of a formatted presentation. The compiled code includes a necessary element for creating or invoking a first application for presenting the presentation and/or for creating or invoking a second application for being presented with the presentation;
- an instant message application displayed on a networked device comprising a compiled code of a formatted presentation, said compiled code including a necessary element for creating or invoking a first application for presenting said presentation and/or for creating or invoking a second application for being presented with said presentation; and
- a web page displayed on a networked device comprising a compiled code of a formatted presentation, said compiled code including a necessary element for creating or invoking a first application for presenting said presentation and/or for creating or invoking a second application for being presented with said presentation.

Other aspects of the invention include a computer-readable medium having computer-executable instructions for performing the methods recited in the above aspects.

DETAILED DESCRIPTION OF THE PREFERRED EMBODIMENTS

Illustrative embodiments of the present invention described below provide a computer readable language which separates content from the authoring, presentation, messaging, and transport of the content in a document. More particularly, the invention is directed to a computer readable language which contains within a document written with the language, not only the information to be communicated, but also includes information depicting the means (e.g., email, instant messaging) and the protocol of communicating it, information regarding who may create or change the information, information on who may view the information and information on how the information may be viewed. All of this information being contained within a text document which is easily searchable, and which is small in file size for easy dissemination throughout a computer network.

Those skilled in the art will appreciate, however, that embodiments in accordance with the invention are not limited to messaging, but, rather, may also be used in presenting and disseminating any information over a computer network. Those skilled in the art will also recognize that the inventions disclosed herein will also may be used in a variety of systems and architectures. Embodiments of the invention will be described with reference to FIGS. 1–8 which are not intended to limit the scope of the claims.

Figure 1:
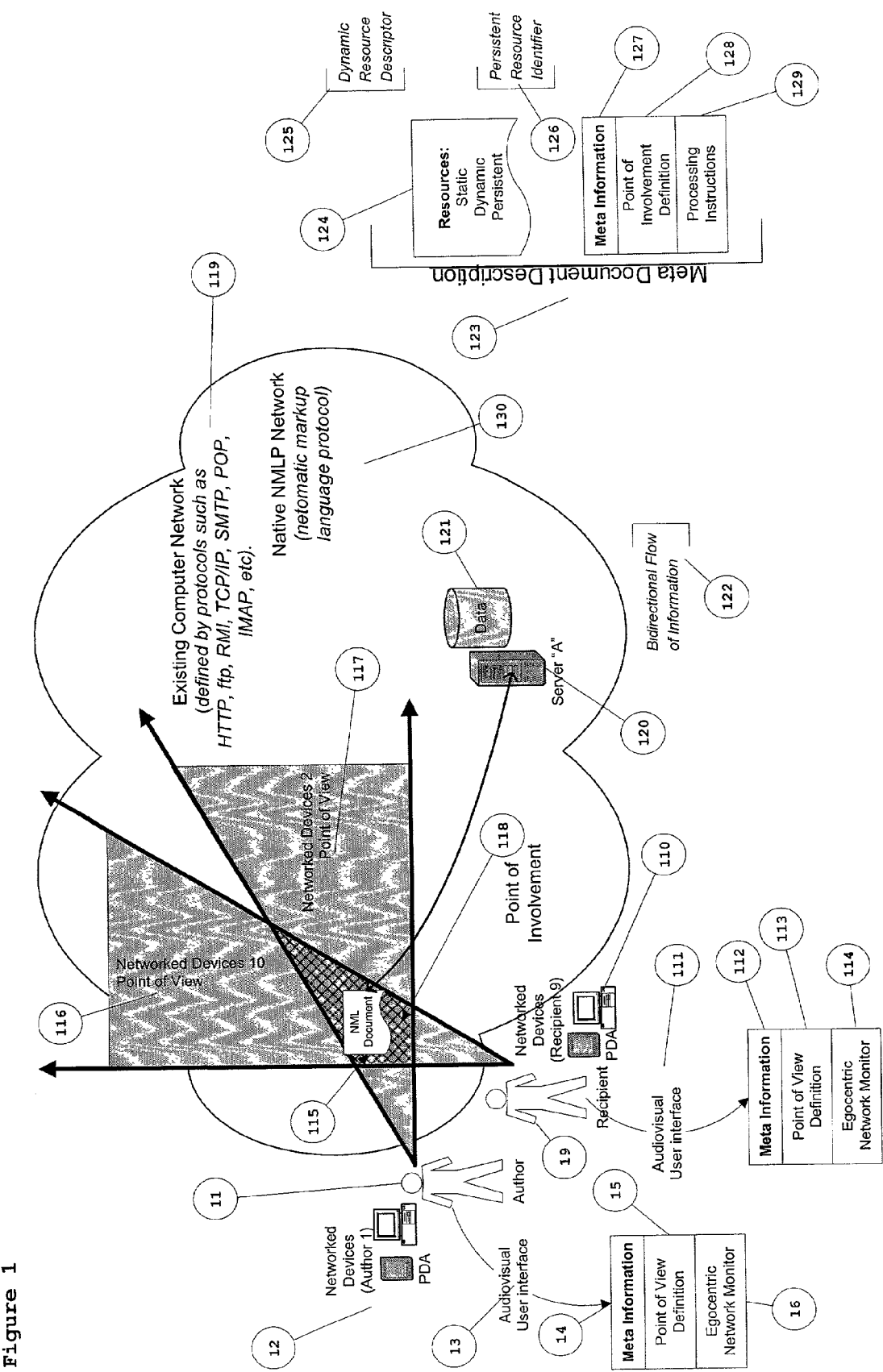
FIG. 1 illustrates an overview of an egocentric network according to the present invention.

FIG. 1 illustrates an Egocentric Network according to the present invention. The Egocentric Network generally preferably includes an Author 11, an NML Document 115, a Recipient 19, a Point-of-View 117 of the Author, a Point-of-View 116 of the Recipient and a Point of Involvement 118 of the NML Document. To that end, the Author creates a NML Document using a Networked Device 12, such as (for example) a personal computer on a local area network, via an Audiovisual User Interface 13. The created NML Document includes Meta Information 14 which comprises a Point of View Definition 15 and supports an Egocentric Network Monitor 16.

The Author disseminates (i.e., messages) the NML Document to a Recipient through an Existing Computer Network 119 or a Native netomatic markup language protocol (NMLP) Network 130 (collectively as Network). The dissemination creates the Point of View 117 from the Networked Device 12 of the Author. The Point of View 117 and the Point of View 116 reflect interactions, for each of the Author and Recipient, respectively, with one or more instances by a Recipient, NML Document 115, an Author or other resources in the Network.

An Egocentric Network Monitor 16 presents an audiovisual representation of the egocentric network of Author 11 on Networked Device 12. This representation includes representation of a Point of View 117 and a Point of Involvement 118 for each NML Document the Author 11 has created, edited, forwarded, or replied to. Thus, as recipients interact with the Author's NML Document 115 on the Network, Meta Information 123 pertaining to NML Document 115 is displayed by the Egocentric Network Monitor 16 of the Author.

Correspondingly, an Egocentric Network Monitor 114 of Recipient 19 presents an audiovisual representation of the egocentric network of Recipient 9 on a networked device 110 of the recipient. This representation includes Point of View 116 and Point of Involvement 118 for each NML Document the Recipient 9 has received, edited, forwarded, or replied to.

The Recipient 19 interacts with NML Document 115 using the Networked Device 110 (i.e., a networked personal computer) through an Audiovisual User Interface 111 which makes available certain Meta Information 112, Point of View Definition 113 and the Recipient's Egocentric Network Monitor 114. An intersection of the Author's Point of View 117 and the Recipient's Point of View 116 of NML Document 115 creates a Point of Involvement 118 about NML Document 115. The Point of Involvement 118 of NML Document 115 contains how various instances of Recipient 19 and other nodes in the Network are interacting with NML Document 115. The Point of Involvement 118 is updated for each interaction between an Author 11 and NML Document 115 or Recipient 19 and NML Document 115.

When a NML Document is disseminated through the Network, it is typically stored on a computer Server A 120 with Data 21 (for example). The Computer Server A contains a Meta Document Description 123 which comprises Resources 124 and Meta Information 127 about each NML document uploaded. Dynamic resources of the document are described via Dynamic Resource Descriptor 125 and persistent resources are identified through Persistent Resource Identifier 126. The Meta Information 127 contains a Point of Involvement Definition 128 and Processing Instructions 129 for the NML Document 115.

Figure 2:
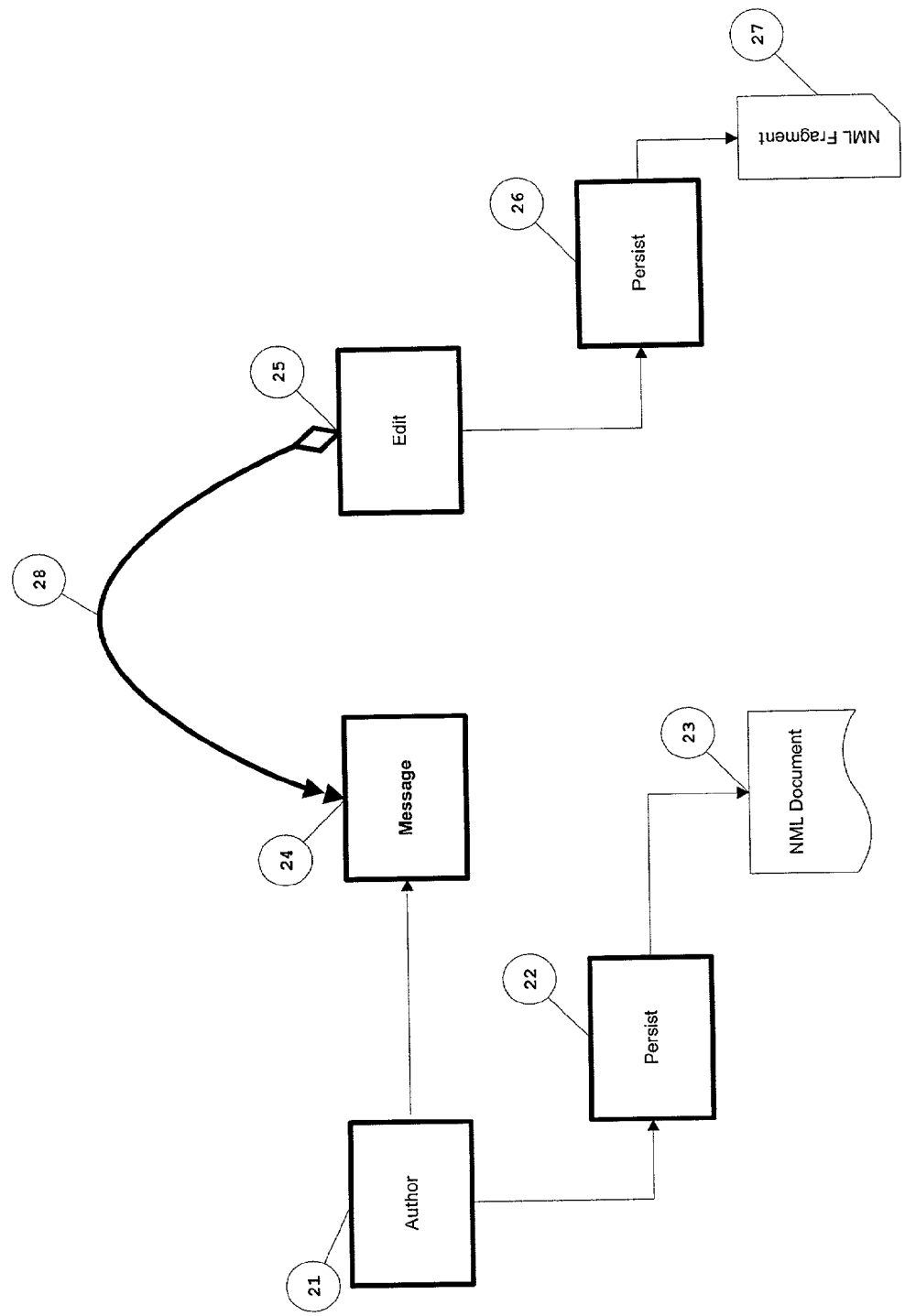
FIG. 2 illustrates a workflow overview of the egocentric network according to the present invention.

As shown in FIG. 2, an NML document 23 is created by an Author 21 who messages 24 the document (e.g., via email, instant messaging) to a recipient. The NML Document 23 is stored within the Egocentric Network through a Persist process 22. A recipient of the document may Edit 25 the document and store changes or updates through the Persist process as well. Such changes and updates create an NML Fragment 27. The NML Fragment 27 may then be re-sent to other recipients through the Message process. An example of such an NML fragment is set out below.

```
<?xml version="1.0" encoding="UTF-8"?>
<nml version="1.0">
    <nmlHeader>
        <nmlHeaderRef uri="http://www.netomat.net/forbes/frag/header/update?"/>
    </nmlHeader>
    <nmlBody>
        <nmlFrag id="780kjgf6754dfg">
            <ContextDef path="/group/"
parentRef"http://www.netomat.net/amelie/pop.nml" insert="true"/>
            <group id="5_pic3">
                <image noHighlight="true" href="5_pic3_pop.gif" x="525" y="180"
permeable="true"/>
                <text noHighlight="true" x="390" y="25" color="#ff6600"
font="Courier:11, sans-serif:11" text="Amelie Poulain has promised to become a regular do-
gooder." align="left"/>
            </group>
        </nmlFrag>
    </nmlBody>
</nml>
```

Figure 3:
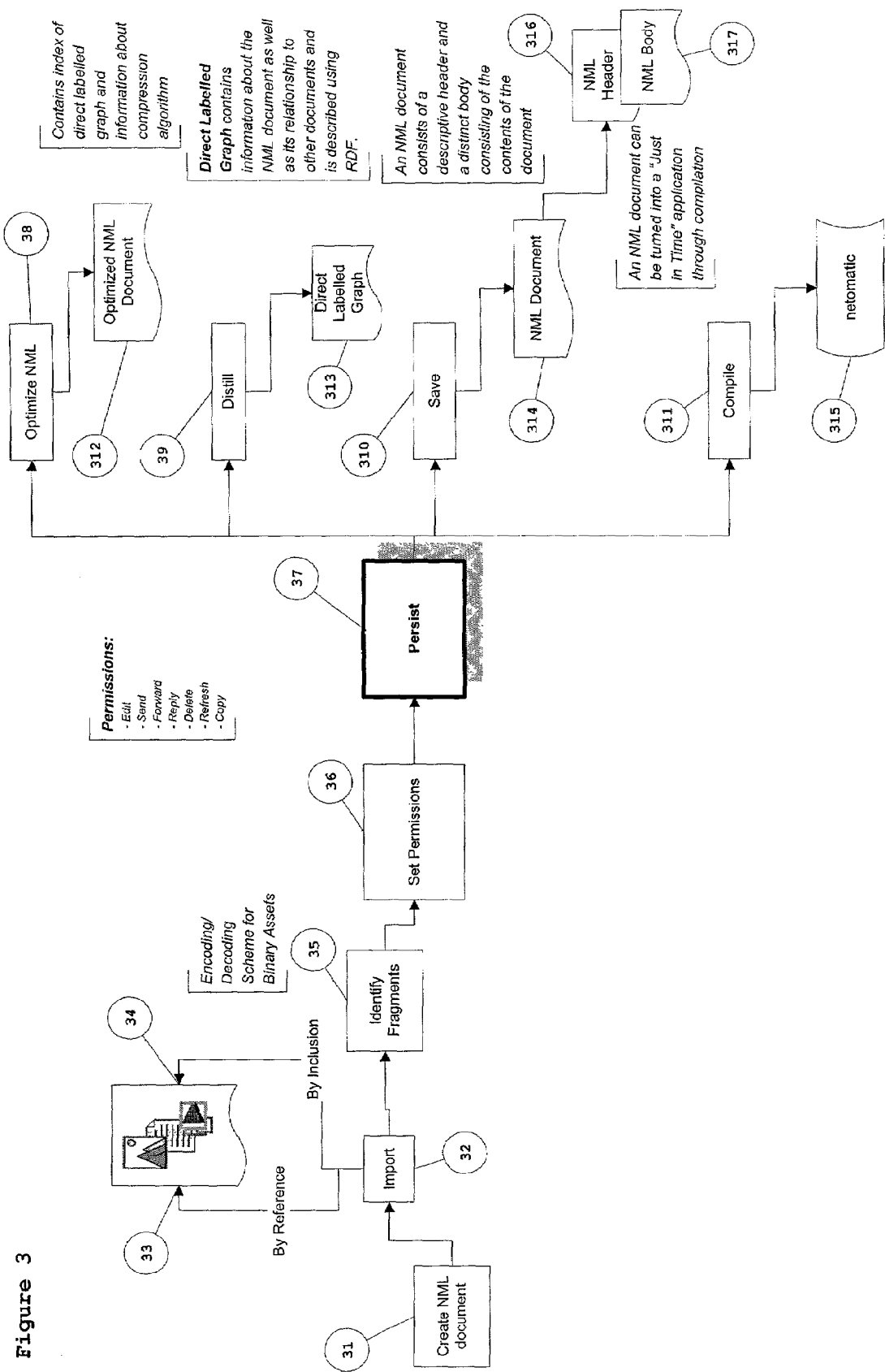
FIG. 3 illustrates an authoring workflow of the egocentric network according to the present invention.

NML documents are created by an Author importing information, which may include other NML Documents or other multimedia data according to FIG. 3. The information 32 may be included in the NML document via an external reference 33 or by inclusion 34. Fragments 35 may be identified by the author, which may be assigned attributes or permissions through a Set Permissions step 36.

An NML document is stored on the egocentric network through the Persist process 37, which causes the NML Document 31 to be saved 310 as a persistent NML Document 314. The persistent NML document includes a NML Header 316, which includes meta-information about the NML persistent document, and a NML Body 317 having the contents (information) of the NML Document 314. Embodied within Persist 37 step is the Distill process 39 which creates a Direct Labeled Graph 313. The Direct Labeled Graph 313 is a representation of NML Document 314 in the Resource Description Framework (RDF) format and contains information about the NML Document as well as its relationship to other documents. Such an NML sample containing an RDF document in the NML header is shown below:

```xml
<?xml version="1.0" encoding="UTF-8"?>
<nml version="1.0">
    <nmlHeader>
        <rdf:RDF xmlns:rdf="http://www.w3.org/1999/02/22-rdf-syntax-ns#" xmlns:nml="http://www.netomat.net/rdf/schema/">
        <rdf Description about="http://www.netomat.net/db/recreation/sports/golf/golfers/men/TigerWoods/">
            <nml:Scenegraph>
                <nml:NMLObj about="http://www.netomat.net/db/recreation/sports/golf/golfers/men/TigerWoods/tw2">
                    <nml:PanRight>15.0</nml:PanRight>
                    <nml:Zoom>1.053</nml:Zoom>
                </nml:NMLObj>
            </nml:Scenegraph>
        </rdf:Description>
        <!-- ....-->
        <rdf:Description about="http://mycollege.edu/courses/6.001">
            <nml:Players>
                <rdf:Bag>
                    <rdf:li resource="http://www.netomat.net/db/recreation/sports/golf/golfers/men/TigerWoods/tw1"/>
                    <rdf:li resource="http://www.netomat.net/db/recreation/sports/golf/golfers/men/TigerWoods/tw3"/>
                    <rdf:li resource="http://www.netomat.net/db/recreation/sports/golf/golfers/men/TigerWoods/tw4"/>
                    <rdf:li resource="http://www.netomat.net/db/recreation/sports/golf/golfers/men/TigerWoods/tw5"/>
                    <rdf:li resource="http://www.netomat.net/db/recreation/sports/golf/golfers/men/TigerWoods/tw6"/>
                </rdf:Bag>
            </nml:Players>
            <nml:TrackRight resource="http//www.netomat.net/db/recreation/sports/golf/golfers/men/TigerWoods/tw6"/>
        </rdf:Description>
        <!-- ....-->
        <rdf:Description about="http://www.netomat.net/db/recreation/sports/golf/golfers/men/TigerWoods/">
            <nml:Camera>
                <rdf:Bag<
                    <rdf:li resource="http://www.netomat.net/db/recreation/sports/golf/golfers/men/TigerWoods/tw7"/>
                    <rdf:li resource="http://www.netomat.net/db/recreation/sports/golf/golfers/men/TigerWoods/tw10"/>
                    <rdf:li resource="http://www.netomat.net/db/recreation/sports/golf/golfers/men/TigerWoods/tw11"/>
                </rdf:Bag>
            </nml:Camera>
            <nml:DollyForward resource="http://www.netomat.net/db/recreation/sports/golf/golfers/men/TigerWoods/tw6"/>
        </rdf:Description>
        <!-- ....-->
        </rdf:RDF>
    </nmlHeader>
    <nmlBody>
        <!-- ....-->
    </nmlBody>
</nml>
```

An Optimize NML process 38 occurs after the Persist process and creates an Optimized NML Document 312, optimized for display or use on specific platforms or delivery through specific transport protocols. The Optimize NML process also updates the Direct Labeled Graph 313 with information about, for example, a compression algorithm used to create the Optimize NML Document 312.

The Persist process 37 is also followed by a Compile step 311 which creates a just-in-time application (netomatic) 315, which includes the application code and informational content required to present or display the information contained within NML Document 314.

Figure 4:
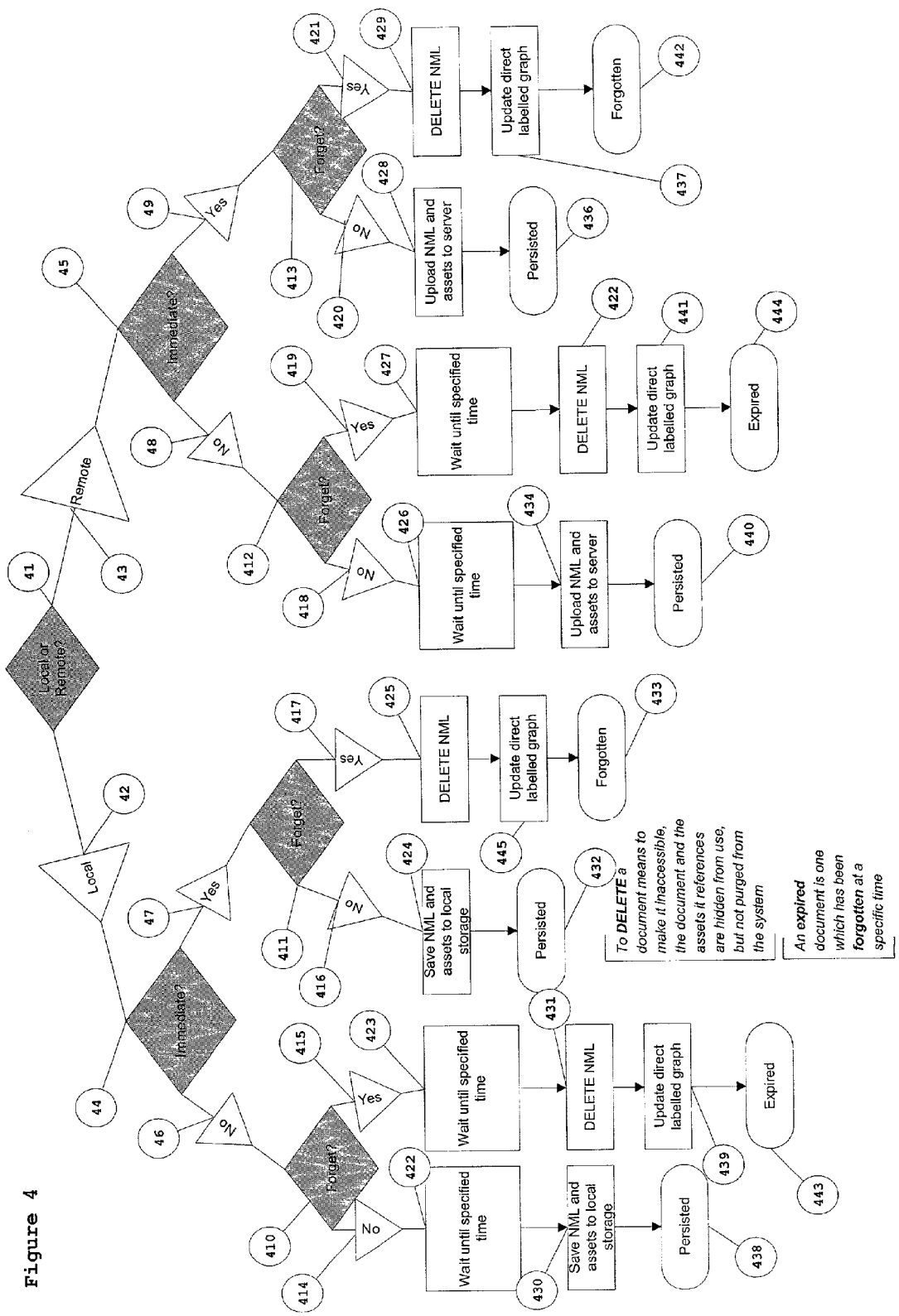
FIG. 4 illustrates a control flow display of the decision process used to control persistence within an egocentric network according to the present invention.

FIG. 4 illustrates the Persistence process, that is, the determination of how to store an NML Document. Initially, a decision is made whether to persist the NML document locally to the computer originating the information or remotely to the computer network (41). If it is decided to persist the NML document locally (42), then a decision is made whether or not to immediately persist the document (44). If the document is not immediately persisted (46) then a decision is made whether to Forget the document (410). If the document is not forgotten (414) then the document is saved locally after a predetermined period of time passes (422). Accordingly, the NML Document is now in a Persisted state 438.

Alternatively, if it is decided that the NML Document is forgotten (415), then the NML Document is Deleted (431) after a predetermined period of time passes. The direct labeled graph for the document is updated (439). The NML Document is then in an expired state 443.

Continuing with FIG. 4, if it is decided to store the document immediately (47), then a decision is made whether to Forget (411) the NML Document. If the document is not forgotten (416), then the NML document is stored locally (424), and the NML Document is persisted (432). If it is decided to forget (417) the document, then the NML Document is deleted (425) and the direct labeled graph for the document is updated (445). The NML Document is then in a Forgotten state (433).

For remote persistence, a similar process to that of local persistence occurs. Thus, initially it is determined whether the NML document is immediately persisted (45). If the document is not immediately persisted (48), then it is decided whether or not to Forget (412) the NML Document. If the document is not forgotten (418), then the document, and its included assets, is uploaded to a remote server (434), after a predetermined period of time (426). The document is now persisted (440). If the document is forgotten, then the NML document is removed by being deleted (435) after a predetermined period of time, and the direct labeled graph for the document is updated (441). The NML Document is then in the expired state (444).

If the document is immediately persisted (49), and is not forgotten (413, 420), then the process uploads the NML Document and its included assets to a remote server (428). The NML Document is now persisted (436). If the document is forgotten (421) then the NML Document is deleted (429) and the direct labeled graph for the NML Document is updated 437. The NML Document is now in the Forgotten 442 state.

Figure 5:
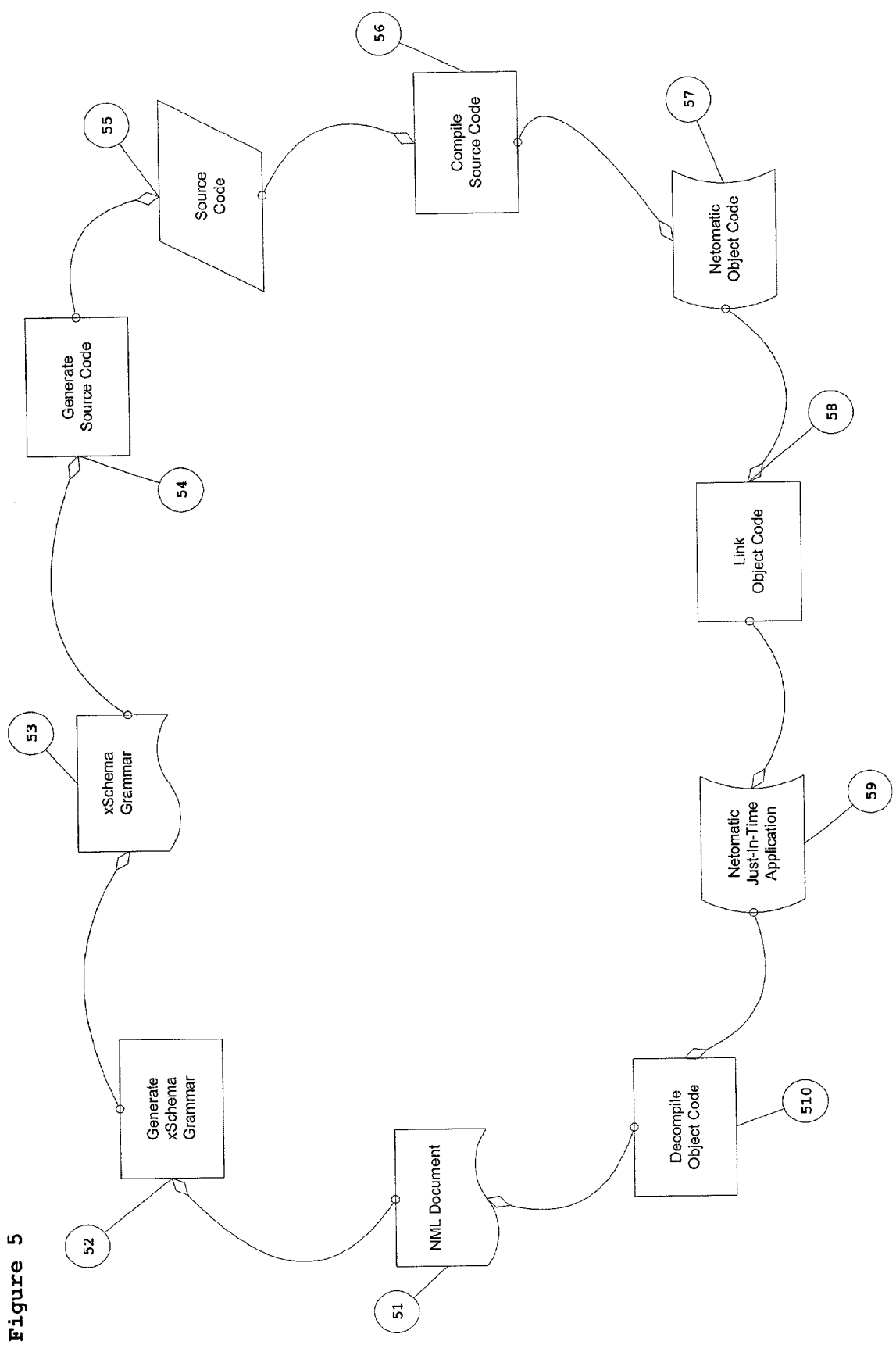
FIG. 5 illustrates the workflow of a just-in-time application according to the present invention.

One of the predominant features of the present invention is the ability to create a "just-in-time" application (the "netomatic" application), as shown in FIG. 5, which illustrates the process of compiling an NML Document into a netomatic, just-in-time application. Accordingly, an author creates an NML Document 51 through the Authoring and Persistence processes described in FIG. 3 and FIG. 4. The NML Document 51 is processed via Generate xSchema Grammar 52 to create an xSchema Grammar 53 for the NML Document 51. This xSchema Grammar 53 is processed via Generate Source Code 54 which results in Source Code 55 which is compiled via Compile Source Code 56 into Netomatic Object Code 57. The Netomatic Object Code 57 may be combined with object code libraries specified in NML Document 51 through Link Object Code 58 to create the Netomatic Just-In-Time Application 59. Through Decompile Object Code 510 the NML Document 51 is generated from the Netomatic Object Code 57 and Netomatic Just-In-Time Application 59. Accordingly, below is an example of a decompiled NML Object as produced through Decompile Object Code 510.

```
<?xml version="1.0" encoding="UTF-8"?>
<nml version="1.0">
  <nmlHeader>
    <!-- ....-->
    <NMLObj id="3" type="vector" name="net.netomat.editor.Dispatch"
value="3, 7, 10, 42, 45, 48, 50, 53, 57, 60, 63, 66, 69, 72, 75, 78, 81, 88,
93, 97, 102, 106, 111, 113, 116, 119, 122, 124, 126, 128, 130, 132, 134,
136, 138, 140, 142, 144, 146, 148, 150, 152, 154, 157, 159, 162, 165,
168">
      <NMLObj type="float" name="net.netomat.editor.Transform"
value="0.4824945f"/>
    </NMLObj>
    <NMLObJ id="4" type="URI" name="net.netomat.editor.Link"
value="3,5,76,40" from="2" to="5"/>
    <NMLObj id="5" type="string" name="net.netomat.editor.TextGen"
value="Tiger Woods broke through an imaginary "picket line"
this week when he filmed a commercial in Toronto for General Motors
as part of his contractual obligation as a Buick spokesman.">
      <NMLObj name="java.awt.Font" value="Arial, 18"/>
      <NMLObj name="java.awt.geom.AffineTransform"
value="4.100451741799471d, 0.0d, 0.0d 4.100451741799471d,
-1646.7296391909335d, -7965.192829330378d"/>
    </NMLObj>
    <NMLObj id="7" type="image" name="net.netomat.editor.Picture"
url="http://www.golfonline.com/images/tw.gif" alt="Tiger Woods filming
a commercial in Toronto for General Motors"
altURL="http://www.netomat.net/cache/tw.gif">
      <NMLObj name="java.awt.geom.AffineTransform"
value="5.0209054807093362d, 0.0d. 0.0d 5.0209054807093362d,
-27.154998228391890d, -3135.314758270212d"/>
    </NMLObj>
    <NMLObj id="8" type="URI" name="net.netomat.editor.Link"
value="7, 10, 24 88, 93, 97, 102, 106," from="10" to="24"/>
    <!-- ....-->
  </nmlHeader>
  <nmlBody>
    <!-- ....-->
  </nmlBody>
</nml>
```

Figure 6:
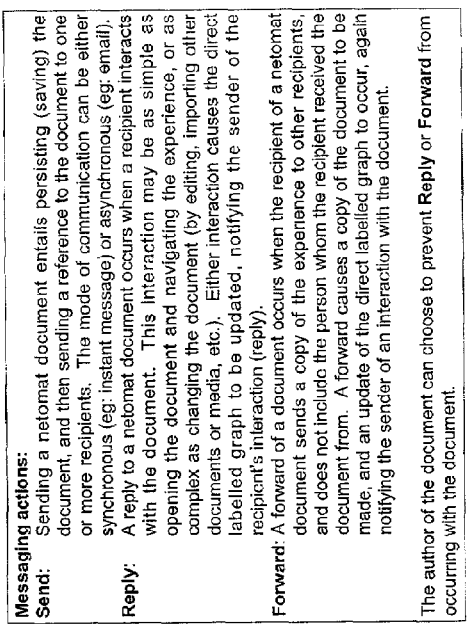
FIG. 6 illustrates an overview of a messaging framework within the egocentric network according to the present invention.
Figure 6:
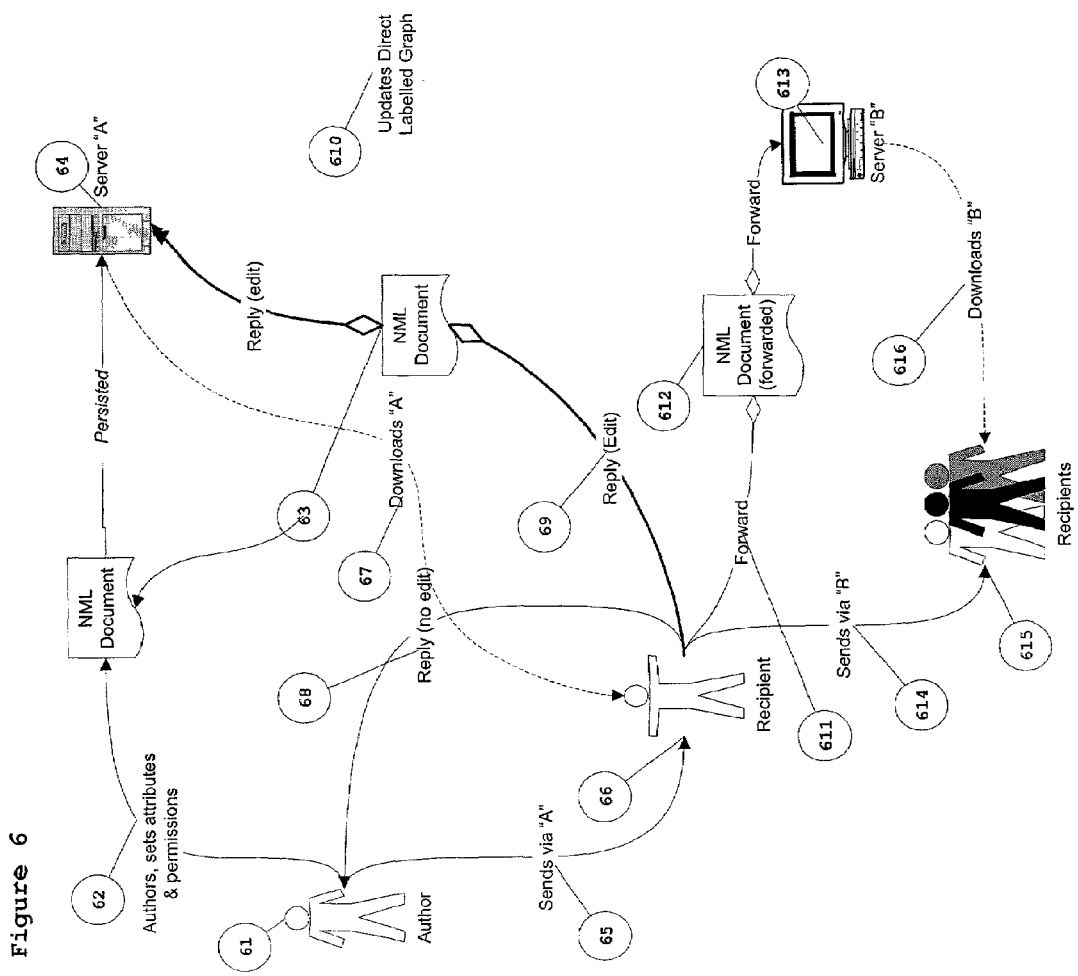

The process for sending an NML document from an author to one or more recipients is illustrated in FIG. 6 (i.e., messaging). The Author 61 authors, sets attributes and permissions 62 on an NML Document 63 and Persists the document to a computer Server A 64. The Author 61 then Sends 65 a reference to the NML Document 63 to a Recipient 66. The mode of communication may be either synchronous (e.g., instant messaging) or asynchronous (e.g., email). When the Recipient 66 opens the NML Document 63 and downloads the related assets 67 an NML Reply 68 is sent to the Author 61 (to be viewed on the Author's egocentric network monitor).

The Recipient 66 may also create an NML Reply 69 by editing or changing the NML Document 63 and storing such changes to computer Server A 64.

The Recipient 66 may also prepare to forward 611 the NML document by copying the NML Document 63 to NML Document 612 on Computer Server B 613. This causes the Direct Labeled Graph corresponding to NML Document 63 to be Updated 610 on computer Server A 64. The Recipient 66 may then Send 614 the NML Document 612 to other Recipients 615 to download 616 the NML Document 612 and related assets from computer Server B 613.

Figure 7:
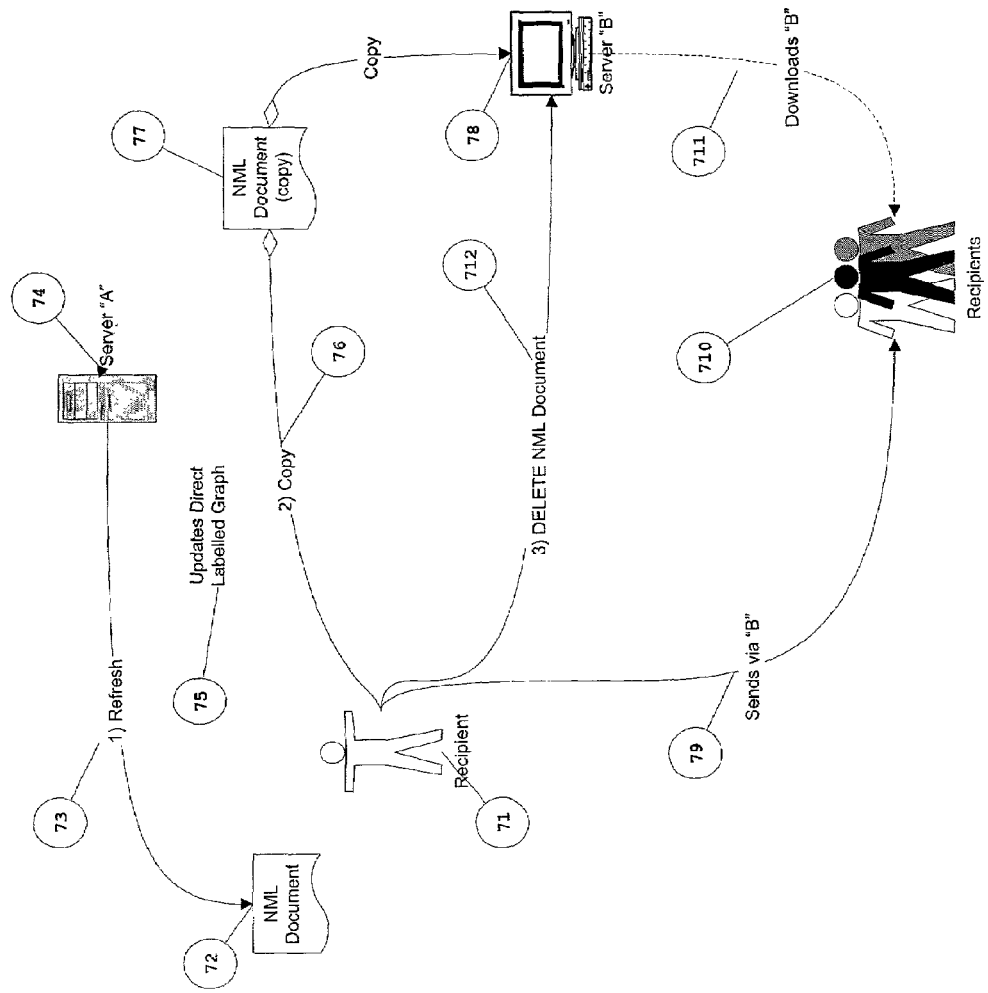
FIG. 7 illustrates a display of message attributes and states within the egocentric network according to the present invention.

FIG. 7 illustrates the messaging attributes, permissions, and states which may be ascribed to an NML Document. Accordingly, a Recipient 71 with a local or cached copy of an NML Document 72 places the NML Document in the Refresh 73 state by reloading or refreshing the contents of the NML Document 72 from computer Server A 74. This Refresh 73 causes an update 75 to the Direct Labeled Graph corresponding to the NML Document 72 on computer Server A 74.

The Recipient 71 may Copy 76 the NML Document 72 to NML Document 77 on computer Server B 78. This Copy 76 action places the NML Document 77 in the "copy" state. The Direct Labeled Graph for NML Document 72 on computer Server A 74 is not updated. A new Direct Labeled Graph is created to represent NML Document 77 on computer Server B 78.

The Recipient 71 may Send the NML Document 77 on to other Recipients 710 causing an update to the Direct Labeled Graph for NML Document 77 on computer Server B 78. Recipients 710 will Download 711 the NML Document 77 and related assets from computer Server B 78.

The Recipient 71 may place the NML Document 77 in the Delete 73 state on the computer Server B 78. This causes the NML Document 77 and its related assets to become unavailable for use by either Recipient 71 or Recipients 710 and causes an update to the Direct Labeled Graph for NML Document 77 on computer Server B 78 to reflect that NML Document 77 is in the Delete 73 state.

Figure 8:
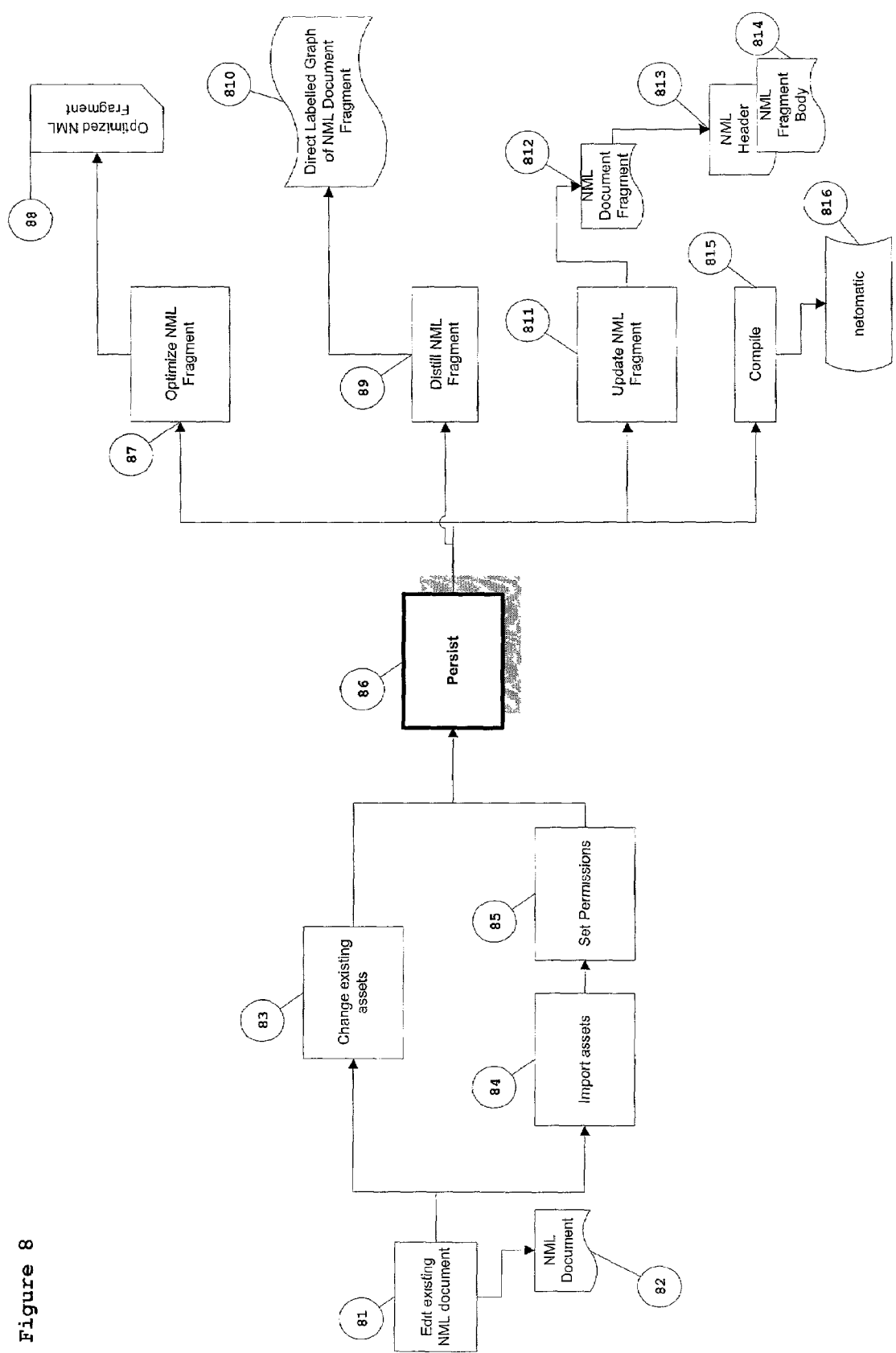
FIG. 8 illustrates a display of the editing workflow within the egocentric network according to the present invention.

Existing NML documents may be edited as shown in FIG. 8. Accordingly, an author or recipient Edits 81 an existing NML Document 82 by Changing 83 existing assets, Importing 84 additional assets and/or by Setting Permissions 85 on the NML Document 82. The NML Document 82 is stored to the egocentric network through the Persist 86 process which causes the changes to the NML Document 82 to be stored through Update 88 to a persistent NML Document Fragment 812. An NML Document Fragment 812 comprises an NML Header 813 and an NML Fragment Body 814, which is preferably comprised solely of those changes to NML Document 82. The NML Header 813 includes meta-information about NML Document 814.

Embodied within Persist 85 step is a Distill 89 process which creates the Direct Labeled Graph 810. The Direct Labeled Graph 810 is a representation of NML Document Fragment 812 in a resource description framework (RDF) format. The Direct Labeled Graph 810 contains information about NML Document Fragment 812, its relationship to the original NML Document 2 as well as the relationship to other documents.

The Optimize NML 87 process occurs after the Persist process 86 and creates an Optimized NML Document Fragment 88. The Optimized NML Document Fragment 88 is optimized for display or use on specific platforms or delivery through specific transport protocols. The Optimize NML 78 process also updates the Direct Labeled Graph 810 with information about the compression algorithm used to create the Optimize NML Document Fragment 88.

The Persist 86 process is also followed by a Compile 815 step which creates a just-in-time application (Netomatic) 816. The Netomatic 816 includes the application code and information content required to present or display the information contained within NML Document 82 and NML Document Fragment 812.

Below are examples of various NML documents according to the present invention for reference.

Sample NML code for a Platform Component Configuration: The header of this document describes a node (i.e. a client computer or networked device) on a network, how the node is configured and describes the services to which this node subscribes.

```
<?xml version="1.0" encoding="UTF-8"?>
<nml version="1.0">
    <nmlHeader>
        <Version id="1000x003" number="9"/>
        <Host hostURL="http://www.netomat .net/data/" hostName="netomat.net"/>
        <Name title="netomat"/>
        <Author firstname="maciej" lastname="wisniewski"/>
        <Date date="June 12 1999"/>
        <User name="maciej" id="mzw" password="ferh%df7sjd9"
SMTPserver="www.interport.net" POPserver="pop.interport.net" email="mzw@interport.net"/>
        <OperatingSystem name="Win" version="95"/>
        <Java version="JRE1.2.2" vendor=Sun"/>
        <Proxy type="socks" address="socks.netomat.net" port="1080"/>
        <Speed bps="128000"/>
        <NetworkingEngine name="net.netomat.network" varsion="0.8bx"/>
        <DisplayEngine name="net netomat.layout" version="0.9floatC"/>
        <SoundEngine name="net netomat.media.sound" version="0.5"/>
        <TranslationEngine name="net.netomat.tranlater" version="0.3"/>
        <EditingEngine name="net.netomat.editor" version="0.7fg"/>
        <EncodingEngine name="net netomat.encoder" version="0.8"/>
        <XMLEngine name="org.apache.xerces.parsers" version="1.2.0"/>
        <XMLObjetModel name="org.apache.xercas.dom.traversal" version="1.2.0"/>
        <!-- ....-->
        <Service protocol="http" method="post" uri="http://www.netomat.net/bin/data?">
            <ServiceCondition timeout="10" timeLimit="60" maxSize="150K"/>
            <ServiceFormat type="jpeg, gif, png, bmp, nml, html, txt"/>
            <ServiceFailure>
                <ServiceUnavailableException uri="http://www.thing.net/cgi-
```

```
bin/redirect?"/>
                <ServiceBusyException retry="3" wait="30"/>
                <TimeLimitExceededException process="true"/>
                <SizeLimitExceededException process="false"/>
                <SchemaViolationException process="false"/>
                <CommunicationException process="true"/>
                <OperationNotSupportedException process="true"/>
        </ServiceFailure>
        <ServiceQueryString query="q" interface="xpath"/>
        <ServiceStream starts_with="<service>"
ends_with="</service>" trim_to="<service>" trim from="</service>"/>
        <ServiceRange start="0" end="EOF"/>
    </Service>
    <!-- ....-->
    <Service protocol="ftp" uri="ftp:"ftp.netomat.net/">
        <!-- ....-->
    </Service>
    <!-- ....-->
</nmlHeader>
<nmlBody>
    <group>
        <rect color="#ffffff" fillcolor="#ffffff" height="450" width="650"/>
        <image noHighlight="true" href="12e_pic.jpg"/>
        <anchor rollover="jump(@12b.nml)">
            <image noHighlight="true" href="12b_thumb.jpg" x="400" y="0"/>
        </anchor>
        <anchor rollover="jump(@12d.nml)">
            <image noHighlight="true" href="12d_thumb.jpg" x="265"
y="115"/>
        </anchor>
        <anchor rollover="jump(@12c.nml)">
            <image noHighlight="true" href="12c_thumb.jpg" x="400"
y="276"/>
        </anchor>
        <anchor rollover="jump(@12a.nml)">
            <image noHighlight="true" href="12a_thumb.jpg" x="45" y="280"/>
        </anchor>
        <image noHighlight="true" href="logo.gif" x="530" y="120"/>
        <image noHighlight="true" href="12_clocktext.gif" x="476" y="178"/>
        <text file="/netomat/poll?src=12a.nml" font="Verdana:11, sans-serif:11"
x="454" y="220" color="#ff6600"/>
        <clock timeZone="ECT" font="Verdana:11, sans-serif:11" x="500" y="172"
color="#ff6600"/>
        <clock timeZone="JST" font="Verdana:11, sans-serif:11" x="524" y="185"
color="#ff6600 "/>
        <clock timeZone="EST" font="Verdana:11, sans-serif:11" x="500" y="200"
color="#ff6600"/>
        <clock timeZone="PST" font="Verdana:11, sans-serif:11" x="510" y="212"
color>"#ff6600"/>
        <anchor click="jump(@booth.nml)">
            <image href="12 arrow.gif" noHighlight="true" x="287" y="26"/>
        </anchor>
        <anchor click="jump(@4.nml)">
            <image href="12_video.gif" noHighlight="true" x="589" y="0"/>
        </anchor>
        <anchor click="jump(@20.nml)">
            <image href="12_letter.gif" noHighlight="true" x="213"
y="377"/>
        </anchor>
    </group>
</nmlBody>
</nml>
Sample NML Code for incorporating a web meta-search interface into a document. This example
retrieves search results from multiple sources:<?xml version="1.0" encoding="UTF-8"?>
<nml version="1.0">
    <nmlHeader>
        <!--...-->
        <Version compatible="1000x003" description="Contains update to 1000x002"
size="30066"/>
        <!--...-->
        <Service protocol="http" method="post" stream="text/html"
objectModel="pattern">
            <!--...-->
            <TextURI uri="http://www.altavista.com/cgi-
bin/query?kl=XX&pg=q&text=yes&q=q"/>
            <TextQueryString query="q"/>
            <TextStream starts_with="<dd>" ends_with="< /dd>"
```

-continued

```
trim_to="<dd>" trim from="</dd>"/>
            <TextURI uri="http://www.northernlight.com/nlquery.fcg?cb=0&qr=q"/>
            <TextQueryString query="q"/>
            <TextStream starts_with="<td valign=top><FONT size=2
face=arial, helvetica>" ends_with="</a><br>" trim_to="">"
trim_from="</a><br>"/>
            <ImageURI
uri="http://arribavista.com/Searching/Search_Results.asp?ss=q&SearchType=picture"/>
            <ImageQueryString query="q"/>
            <ImageStream starts_with="<a href="javascript:URLLinker
("ends_with="</a>" trim_to="','" trim_from="')"
onmouseover="window.status='click to view on the web';return true"
title="/>
            <ImageURI uri="http://ston.jsc.nasa.gov/cgi-
bin/SFgate?database=edcc2.jsc.nasa.gov%3A210%2FPAO&convert=waistoimg&directget=1&
text=q&maxhits=10"/>
            <ImageQueryString query="q"/>
            <ImageStream starts_with="<A HREF=""
ends_with="</B><BR>" trim_to="<A HREF="" trim_from=""><img
align=left"/>
            <ImageURI
uri=http://scour.net/Search/Search.phtml?protocol=all&index=image&query=q"/>
            <ImageQueryString query="q"/>
            <ImageStream starts_with="<TR><TD align="center"
valign=" center">"
ends_with="border=" 0"></A></TD></TR>" trim_to="<A
href="" trim_from="" ;><IMG src="http://media.scour.net"/>
            <SoundURI
uri="http://scour.net/Sound/Search.phtml?protocol=&broadband=&query=q&index=wav&
amp;protocol=all&x=11&y=8"/>
            <SoundQuerystring query="q"/>
            <SoundStream starts_with="<TD rowspan="2"
class=" smallFeatureCopy"align=" center" >"
ends_with="border="0"></A></TD>" trim_to="<A href=""
trim_from=""class="normalFeatureLink">"/>
            <!--...-->
        </Service>
        <!--...-->
    </nmlHeader>
    <nmlBody>
        <group>
            <image href="menu.jpg/>
            <anchor click="link (http://www.netomat.net)">
                <image href="neto_logo.gif" x="200" y="2"/>
            </anchor>
            <image href="gnome.jpg" x="34" y="14"/>
            <anchor click="popup(memu@pop.nml)">
                <image href="index_logo.gif" x="268" y="404 "/>
            </anchor>
            <image href="binoc.gif" x="382" y="263"/>
            <image href="cafe.gif" x="103" y="345"/>
            <anchor rollover="popup(menu_english@pop.nml)">
                <image href="menu_french.gif" x="189" y="36"/>
            </anchor>
            <anchor click=jump(@booth.nml)">
                <image href="menu_photo.gif x="489 " y="35"/>
            </anchor>
        </group>
    </nmlBody>
    <nml/>
```

Sample NML Code for Capturing, in an NML document, the search results retrieved from a web search using a web meta-search interface according to the above sample code as well as meta-information about the search such as the original search query, time stamps, categories within which the results were found, etc.:

```
<?xml version="1.0" encoding="UTF-8"?>
<nml version="1.0">
    <nmlHeader>
        <!-- ....-->
        <Service uri="http://search.yahoo.com/bin/search?p=queryString"
```

-continued

```
serviceName="Yahoo" queryString="Tiger Woods" retcode="1" query_id="tw12" total_nr_pages="42"
act_page="2" act_hits="654" timestamp=Sept 12 2000 16:04:32" nethit="23"/>
          <HIT ranking_order="1" lc="en" cc="us">
               <CATEGORY name="Recreation > Sports > Golf > Golfers > Men
>" value="Woods Tiger"/>
               <TITLE locator="http://www.tigerwoods.com/">Tiger Woods</TITLE>
               <ABSTRACT>
       - official site of Tiger from CBS SportsLine complete with video interviews, photos,
stats and features.
     </ABSTRACT>
               <LASTMOD>null</LASTMOD>
               <DUP locator="http://pages.prodigy.com/boshk/woods.htm"
ranking_order="6"/>
          </HIT>
          <HIT ranking_order="2" lc="en" cc="us">
               <CATEGORY name="Recreation > Sports > Golf > Golfers > Men
>" value="Woods Tiger">
               <TITLE locator="http://www.pgatour.com/players/intro/8793.html">PGA
Tour.com:Tiger Woods </TITLE>
               <ABSTRACT>
    - biography, photo gallery, and recent news.
     </ASSTRACT>
               <LASTMOD>Sep. 9 2000</LASTMOD>
          </HIT>
          <!-- ....-->
     </nmlHeader>
     <nmlBody>
          <!-- ....-->
     </nmlBody>
     </nml>
Sample NML code describing a complete NML Document (e.g., message) containing header
information describing the document (DocumentReference information such as document ID,
description, state, permissions, etc.), how the document is messaged (MessageHeader info such
as "from", "to", modes of delivery, message timestamps, etc.), how the document is routed
(RoutingHeader information such as the Sender URI and the Receiver URI) as well as the body
of the NML document or message (nmlBody):<?xml version="1.0" encoding="UTF-8"?>
<nml version="1.0">
     <nmlHeader>
          <DocumentReference>
               <DocumentLabel>Forbes</DocumentLabel>
               <DocumentId>nml:netomat.netWER9015488876</DocumentId>
               <DocumentDescription lang="en-us">Forbes Media
Kit </DocumentDescription>
               <DocumentState>
                    <Copied is="true" on="20020224" by=""na" from="forbes.nml"
to="myfirstnml.nml">Copy based on Forbes newsletter</Copied>
                    <Refreshed is="true" on="2002022313:34:58"
synchronized="false">Every time</Refreshed>
                    <Deleted is="true" by="maciej@netomat.net"
on=2002022518:34:21">Can be made active again</Deleted>
                    <Optimized is="true" by="nmlCompressionAlgorithm"/>
                    <Encoded is="true" included="yes" with="base64"/>
                    <Encrypted is=" false" using="na"/>
                    <Distilled is="true"
from="http://www.netomat.net/forbes/forbes.nml"
to="http //www.forbes.com/news/forbes.nml;;http://www.netomat.net/forbes/forbes.nml"/>
                    <Persisted is="true" by="maciej@netomat.net">
                         <Forgotten is="false" on="na"/>
                         <Expired is="false"/>
                         <Edited is="false" by="nobody"/>
                    </Persisted>
               </DocumentState>
               <DocumentPermissions>
                    <Send can="true" who="maciej@netomat.net"/>
                    <Reply can="true" must="false"
who="maciej@netomat.net;;kris@netomat.net;;ed@netomat.net" by="2002040112:00:00"/>
                    <Forward can="true" must="false"
who="maciej@netomat.net;;kris@netomat.net;;ed@netomat.net" by="2002040112:00:00"
notBefore="na" notAfter="na"/>
                    <Publish can="true"
who="maciej@netomat.net;;kris@netomat.net;;ed@netomat.net" notBefore="2002040112:00:00"
notAfter="2002040112:00:00"/>
                    <Copy can="false" who="nobody"/>
                    <Refresh can="true" must="false" interval="10000" how="auto"
who="everybody"/>
                    <Delete can="true" must="false"
who="maciej@netomat.net;;kris@netomat.net;;ed@netomat.net" by="2002040112:00:00"/>
                    <Optimize can="true" must="false" who="anybody"/>
                    <Encode can="true" must="false" who="anyhody" with="base64"/>
```

-continued

```
                <Encrypt can="true" must="false" who="anybody" with="SEA"/>
                <Persist can="true" must="false" who="anybody" imediately="true" forgetBy="na" expireOn="na"/>
                <Edit can="false" who="nobody"/>
            </DocumentPermissions>
        </DocumentReference>
        <MessageHeader>
            <From>
                <PartyId>6673766frddehds876748</PartyId>
            </From>
            <To>
                <PartyId>erwoys5654lk98432</PartyId>
            </To>
            <MessageData>
                <MessageId>5665/876767/8989984/</MessageId>
                <TimeStamp>20011112192452</TimeStamp>
                <Encryption type="PKE">Not encrypted</Encryption>
                <Delivery type="OnceAndOnlyOnce"/>
            </MessageData>
            <MessageActionStatus wasSent="yes" wasReplied="yes" wasRepliedNumOfTimes="3" wasForwarded="yes" wasForwardedNumOfTimes="2">Updated on Feb 24 2002</MessageActionStatus>
            <MessageMode prefered-"yes" mandatory="no" synchronous="no" asynchronous="yes">Communication Mode Information based on last transaction on 2002.02.24</MessageMode>
        </MessageHeader>
        <RoutingHeader>
            <SenderURI>www.forbes.com/netomat</SenderURI/>
            <ReceiverURI/>www.netomat.net/forbes</ReceiverURI>
            <ErrorURI>mailto:maciejw@netomat.net</ErrorURI>
            <TimeStamp>20011112192452</TimeStamp>
            <SequenceNumber>00001</SequenceNumber>
        </RoutingHeadar>
    </nmlHeader>
    <nmlBody>
        <group>
            <rect color="*ffffff" fillColor="#ffffff" height="450" width="650"/>
            <image noHighlight="true" href="index_logo.gif" x="515" y="398"/>
            <image noHighlight="true" x="23" y="37">
                ACEAABAiAAEQXwBEQyJTb3VyY2U6IEhTSSAvV01GLXRvLUNHTSBmaWx0ZXIg
LyBWZXzaW9uIDEuMzUgIiAiRGF0ZTogMTk5OS0wMS0xNyIRZgAB//8AARBi
AAAQpgAAAAkAFxFGAAAA////EYQwIgAQEYogyAAAAAB//3//AAARvwC3ClRJ
TUVTXlJPTUFODFRJTUVTXO1UQUxjQwpUSU1FU19CT0xEEVRJTUVTX0JPTERf
SVRBTElDCUhFTTFZFVE1DQRFIRUxWRVRJQ0FfT0JMSVFVRQ5URUxWRVRJQ0Ff
Qk9MRBZIRUxWRVRJQ0FfQk9MRF9PQkxJQ1VFB0NPVVJJRVIOQ09VUklFUl9J
VEFMMSUMMQ09VUklFUl9CT0xEE0NPVVJJRVJfQk9MRF9JVEFMSUMGU1lMQk9M
ABHOAAABQgABAUEABAMqLToR4gABAGEAACAmAAE9NJ9IIEIAASBiAAAgggAA
IKIAACDI95D0wAhqCzoAAACAQWj5cAa5/TEJikGGAogCUQGQUGIACEAo+dD/
+v7g+TpRYgACUkwAAQAEAAAAAAAAAABRgBxUggAAABkAGQAAFKCCAJAkAEg/
MoAAQITb21IIFRleHQoABA
--/04w6evG8XlLl3ft
                <!-- ... -->
            </image>
            <anchor click="jump(man.nml)">
                <image noHighlight="true" href="15_arrow.jpg" x="94" y="5"/>
            </anchor>
            <image noHighlight="true" href="book_man.gif" x="178" y="78"/>
            <anchor rollover="popup(book_move@pop.nml)">
                <image noHighlight="true" href="book_move.gif" x="96" y="214"/>
            </anchor>
            <anchor rollover="popup(book_woman@pop.nml)">
                <image noHighlight="true" href="book_woman.jpg" x="354" y="60 "/>
            </anchor>
            <anchor rollover="popup(book_amelie@pop.nml)">
                <image noHighlight="true" href="book_amelie.jpg" x="415" y="61"/>
            </anchor>
            <anchor click="jump(@4.nml)">
                <image noHighiight="true" href="15_video.gif" x="8" y="367"/>
            </anchor>
            <anchor click="jump (@8.nml)">
                <image noHighlight="true" href="book_gnome.jpg" x="301" y=" 272"/>
            </anchor>
        </group>
    </nmlBody>
```

</nml>Sample NML code of a complete NML Document which may be edited by a recipient. The ability for a recipient to edit this document is determined by the document state and the document permissions in the nmlHeader and the <edit> tag in nmlBody of the document:

```
<?xml version="1.0" encoding="UTF-8"?>
<nml version="1.0">
    <nmlHeader>
        <DocumentReference>
            <DocumentLabel>Forbes</DocumentLabel>
            <DocumentId>nml:netomat.netWER9015488876</DocumentId>
            <DocumentDescription lang="en-us">Forbes Media Kit</DocumentDescription>
            <Document State>
                <Copied is="true" on="20020224" by="na" from="forbes.nml" to="myfirstnml.nml">Copy based on Forbes newsletter</Copied>
                <Refreshed is="true" on="2002022313:34:58" synchronized="false">Every time</Refreshed>
                <Deleted is="true" by="maciej@netomat.net" on="2002022518:34:21">Can be made active again</Deleted>
                <Optimized is="true" by="nmlCompressionAlgorithn"/>
                <Encoded is="true" included="yes" with="UUE"/>
                <Encrypted is="false" using="na"/>
                <Distilled is="true" from="http://www.netomat.net/forbes/forbes.nml" to="http://www.forbes.com/news/forbes.nml;;http://www.netomat.net/forbes/forbes.nml"/>
                <Persisted is="true" by="maciej@netomat.net">
                    <Forgotten is="false" on="na"/>
                    <Expired is="false"/>
                    <Edited is="false" by="nobody"/>
                </Persisted>
            </DocumentState>
            <DocumentPermissions>
                <Send can="true" who="maciej@netomat.net"/>
                <Reply can="true" must="false" who="maciej@netomat.net;;kris@netomat.net;;ed@netomat.net" by="2002040112:00:00"/>
                <Forward can="true" must="false" who="maciej=netomat.net;;kris=netomat.net;;ed@netomat.net" by="2002040112:00:00" notBefore="na" notAfter="na"/>
                <Publish can="true" who="maciej@netomat.net;;kris@netomat.net;;ed@netomat.net" notBefore="2002040112:00:00" notAfter="2002040112:00:00"/>
                <Copy can="false" who="nobody"/>
                <Refresh can="true" must="false" interval="10000" how="auto" who="everybody"/>
                <Delete can="true" must="false" who="maciej@netomat.net;;kris@netomat.net;;ed@netomat.net" by="2002040112:00:00"/>
                <Optimize can="true" must="false" who="anybody"/>
                <Encode can="true" must="false" who="anybody" with="base64"/>
                <Encrypt can="true" must="false" who="anyhody" with="SEA"/>
                <Persist can="true" must="false" who="anybody" immediately="true" forgetBy="na" expireOn="na"/>
                <Edit can="true" who="anybody"/>
            </DocumentPermissions>
        </DocumentReference>
        <MessageHeader>
            <From>
                <PartyId>6673766frddehds876748</PartyId>
            </From>
            <To>
                <PartyId>erwoys56541k98432</PartyId>
            </To>
            <MessageData>
                <MessageId>5665/876767/8989984/</MessageId>
                <TimeStamp>20011112192452</TimeStamp>
                <Encryption type="PKE">Not encrypted</Encryption>
                <Delivery type="OnceAndOnlyOnce"/>
            </MessageData>
            <MessageActionStatus wasSent="yes" wasRepliedTo="yes" wasRepliedToNumOfTimes="3" wasForwarded="yes" wasForwardedNumOfTimes="2">Updated on Feb 24 2002</MessageActionStatus>
            <MessageMode prefered="yes" mandatory="no" synchronous="no" asynchronous="yes">Communication Mode Information based on last transaction on 2002.02.24</MessageMode>
        </MessageHeader>
        <RoutingHeader>
            <SenderURI>www.forbes.com/netomat</SenderURI>
            <ReceiverURI>www.netomat.net/forbes</ReceiverURI>
            <ErrorURI>mailto:maciejw@netomat.net</ErrorURI>
```

-continued

```
                <TimeStamp>20011112192452</TimeStamp>
                <SequenceNumber>00001</SequenceNumber>
            </RoutingHeader>
        </nmlHeader>
        <nmlBody>
            <group>
                <image href="kodak_top2.gif" x="0" y="0"/>
                <rect height="26" width="265" x="7" y="26" color="#FDB400"/>
                <text font="arial:14:bold, sansserif:14:bold" color="#000000" x="14" y="33">Welcome, David.</text>
                <text font="arial:18:bold, sansserif:16:bold" color="#000000" x="23" y="92">Kids</text>
                <!--tabs-->
                <anchor click="jump (@index.nml)">
                    <image href="manage_h.gif" x="241" y="55"/>
                    <text font="arial:14:bold, sansserif:14:bold" color="#CC3300" x="261" y="65" highlightColor="#FDB400">Manage</text>
                </anchor>
                <anchor click="jump (@create.nml)">
                    <image href="create.gif" x="343" y="55"/>
                    <text font="arial:14:bold, sansserif:14:bold" color="#666666" x="363" y="65" highlightColor="#ffffff">Create</text>
                </anchor>
                <anchor click="junp(@shop.nml)">
                    <image href="shop.gif" x="437" y="=55"/>
                    <text font="arial:14:bold, sansserif:14:bold" color="#666666" x="461" y="65" highlightColor="#ffffff">Shop</text>
                </anchor>
                <anchor click="jump(@send.nml)">
                    <image href="ssnd.gif" x="525" y="55"/>
                    <text font="arial:14:bold, sansserif:14:bold" color="#666666" x="546" y="65" highlightColor="#ffffff">Send</text>
                </anchor>
                <anchor click="jump (@orderprints.nml)">
                    <image href="orderprints.gif" x="610" y="55"/>
                    <text font="arial:14:bold, sansserif:14:bold" color="#666666" x="624" y="65" highlightColor="#ffffff">Order Prints</text>
                </anchor>
                <!--end tabs-->
                <rect height="l" width="727" color="#cccccc" x="5" y="252"/>
                <rect height="1" width="727" color="#cccccc" x="5" y="277"/>
                <!--big bg grey rect-->
                <rect height="173" width="727" x="5" y="278" color="#666666"/>
                <edit who="all" start="na" end="na">
                    <drag>
                        <image href="kid1.gif" x="26" y="130"/>
                    </drag>
                    <drag>
                        <image href="kid2.gif" x="159" y="130"/>
                    </drag>
                </edit>
                <image href="4.gif" x="295" y="116"/>
                <text font="arial:14, sansserif:14" color="#333333" x="25" y="257">organize your photos via drag and drop</text>
                <text font="arial:14, sansserif:14" color="#333333" x="613" y="257">view 6 - 12</text>
                <image href="arrow_right.gif" x="697" y="258"/>
                <!--big cover grey rect-->
                <rect height="173" width="727" x="5" y="328" color="#666666"/>
                <anchor click="jump(@kids.nml)">
                    <image href="album.gif" x="70" y="328"/>
                    <text font="arial:14, sansserif:14" color="#ffffff" x="90" y="396" highlightColor="#000000">Kids</text>
                </anchor>
                <text font="arial:14, sansserif:14" color="#ffffff" x="200" y="396">Trip to</text>
                <anchor click="jump(@trip.nml)">
                    <image href="album.gif" x="185" y=328/>
                    <text font="arial:14, sansserif:14" color="#ffffff" x="200" y="409" highlightColor="#000000">Disney</text>
                </anchor>
                <image href="album.gif" x="299" y="328"/>
                <text font="arial:14, sansaerif:14" color="#ffffff" x="310" y="396">send to</text>
                <text font="arial:14, sansserif:14" color="#ffffff" x="293" y="409">Mom n Dad</text>
                <image href="album.gif" x="410" y="328"/>
                <text font="arial:14, sansserif:14" color="#ffffff" x="420"
```

```
y="396"> houses</text>
            <image href="album.gif" x="524" y="328"/>
            <text font="arial:14, sansserif:14" color="#FFCC00" x="521"
y="396">create new</text>
            <image href="trash.gif" x="662" y="323"/>
            <text font="arial:14, sansserif:14" color="#ffffff" x="668"
y="396">trash</text>
            <rect height="393" width="5" color="black" x="0" y="57"/>
            <rect height="393" width="4" color="black" x="732" y="57"/>
            <image href="kodak bottom2.gif" x="0" y="450"/>
            <anchor click="link(http://www.netomat.net)">
                <image href="netomat_grey.gif" x="5" y="358"/>
            </anchor>
        </group>
    </nmlBody>
</nml>
```

Sample NML code of an NML Document describing how Document Actions (<DocumentActions>), which are typically carried at the nml protocol level, can be contained within the header of the NML Document and still be processed when using other protocols to transport the document such as HTTP or SMTP:

```
<?xml version=1.0" encoding="UTF-8"?>
<nml.version="1.0">
    <nmlHeader>
        =DocumentReference>
            <DocumentLabel>Forbes</DocumentLabel>
            <DocumentId>nml.netomat.netWER9015488876</DocumentId>
            <DocumentDescription lang="en-us">Forbes Media
Kit</DocumentDescription>
            <DocumentState>
                <Copied is="true" on="20020224" by="na" from="forbes.nml"
to=myfirstnml.nml">Copy based on Forbes newsletter</Copied>
                <Refreshed is="true" on="2002022313:34:58"
synchronized="false">Every time</Refreshed>
                <Deleted is="true" by="maciej@netomat.net"
on="2002022518:34:21">Can be made active again</Deleted>
                <Optimized is="true" by="nmlCompressionAlgorithn"/>
                <Encoded is="true" included="yes" with="UUE"/>
                <Encrypted is="false" using="na"/>
                <Distilled is="true"
from="http://www.netomat.net/forbes/forbes.nml"
to="http://www.forbes.com/news/forbes.nml;;http://www.netomat.net/forbes/forbes.nml"/>
                <Persisted is="true" by="maciej@netomat.net">
                    <Forgotten is="false" on="na"/>
                    <Expired is="false"/>
                    <Edited is="false" by="nobody"/>
                </Persisted>
            </DocumentState>
            <DocumentPermissions>
                <Send can="true" who="maciej@netomat.net"/>
                <Reply can="true" must="false"
who="maciej@netomat.net;;kris@netomat.net;;ed@netomat.net" by="2002040112:00:00"/>
                <Forward can="true" must="false"
who="maciej@netomat.net;;kris@netomat.net;;ed@netomat.net" by="2002040112:00:00"
notBefore="na" notAfter="na"/>
                <Publish can="true"
who="maciej@netomat.net;;kris@netomat.net;;ed@netomat.net" notBefore="2002040112:00:00"
notAfter="2002040112:00:00"/>
                <Copy can="false" who="nobody"/>
                <Refresh can="true" must="false" interval="10000" how="auto"
who="everybody"/>
                <Delete can="true" must="false"
who="maciej@netomat.net;;kris@netomat.net;;ed@netomat.net" by="2002040112:00:00"/>
                <Optimize can="true" must="false" who="anybody"/>
                <Encode can="true" must="false" who="anybody" with="base64"/>
                <Encrypt can="true" must="false" who="anybody" with="SEA"/>
                <Persist can="true" must="false" who="anybody"
immediately="true" forgetBy="na" expireOn="na"/>
                <Edit can="false" who="nobody"/>
            </DocumentPermissions>
            <DocumentStatus>
                <Lock exclusive="true" sharedBy="na" universal="false"
```

-continued

```
active="true" href="http://www.netomat.net/locks/lock.nml"/>
            </DocumentStatus>
            <DocumentAction>
                <GetName/>
                <SetName/>
                <GetContentLanguage/>
                <GetContentLength/>
                <GetContentType/>
                <GetElement/>
                <GetAttribute/>
                <PutElement/>
                <PutAttribute/>
                <GetLastModified/>
                <GetLock/>
                <SetLock/>
                <GetResourceType/>
                <GetSource/>
                <getCreationdate/>
            </DocumentAction>
        </DocumentReference>
        <MessageHeader>
            <From>
                <PartyId>6673766frddehds876748</partyId>
            </From>
            <To>
                <PartyId>erwoys56541k98432</PartyId>
            </To>
            <MessageData>
                <MessageId>5665/876767/8989984/</MessageId>
                <TimeStamp>20011112192452</TimeStamp>
                <Encryption type="PKE">Not encrypted</Encryption>
                <Delivery type="OnceAndOnlyOnce"/>
            </MessageData>
            <MessageActionStatus wasSent="yes" wasRepliedTo="yes"
wasRepliedToNumOfTimes="3" wasForwarded="yes" wasForwardedNumOfTimes="2">Updated on Feb 24
2002</MessageActionStatus>
            <MessageMode prefered="yes" mandatory="no" synchronous="no"
asynchronous="yes">Communication Mode Information based on last transaction on
2002.02.24</MessageMode>
        </MessageHeader>
        <RoutingHeader>
            <SenderURI>www.forbes.com/netomat</SenderURI>
            <ReceiverURI>www.netomat.net/forbes</ReceiverURI>
            <ErrorURI/>mailto:maciejw@netomat.net</ErrorURI>
            <TimeStamp>20011112192452</TimeStamp>
            <SequenceNumber>00001</SequenceNumber>
        </RoutingHeader>
    </nmlHeader>
    <nmlBody>
        <group>
            <rect color="#ffffff" fillColor="#ffffff" height="450" width="" 650"/>
            <image noHighlight="true" href="17_pic.jpg" y="56"/>
            <anchor click="jump(@18.nml)">
                <image noHighlight="true" href="17_arrow.gif" x="239" y="359"/>
            </anchor>
            <anchor click="jump(@8.nml)">
                <image noHighlight="true" href="17_gnome.jpg" x="16" y="304"/>
            </anchor>
            <anchor click="jump(@4.nml)">
                <image noHighlight="true" href="17_video.jpg" x="563" y="86"/>
            </anchor>
            <image noHighlight="true" href="logo.gif" x="286" y="11"/>
            <anchor click="jump(@17b.nml)">
                <text noHighlight="true">alt</text>
            </anchor>
        </group>
    </nmlBody>
</NML>
```

NML Netomat Markup Language

The above-identified embodiments and aspects of the present invention are made possible (for example) via a new computer readable language (code) called netomatic markup language (NML). This language presents a unique application or "dialect" of extensible markup language (XML). The code, as shown in the above examples, is similar to XML, but includes unique semantics which allow the egocentric network, authoring application as well as the information controlling application to embody the present invention.

Accordingly, grammatical definitions for the NML language are set out below:

```
                <To>
                        <PartyId>erwoys56541k98432</PartyId>
                </To>
                <MessageData>
                        <MessageId>5665/876767/8989984/</MessageId>
                        <TimeStamp>20011112192452</TimeStamp>
                        <Encryption type="PKE">Not encrypted</Encryption>
                        <Delivery type="OnceAndOnlyOnce"/>
                </MessageData>
                <MessageActionStatus wasSent="yes" wasRepliedTo="yes"
wasRepliedToNumOfTimes="3" wasForwarded="yes" wasForwardedNumOfTimes="2">Updated on Feb 24
2002</MessageActionStatus>
                <MessageMode prefered="yes" mandatory="no" synchronous="no"
asynchronous="yes">Communication Mode Information based on last transaction on
2002.02.24</MessageMode>
            </MessageHeader>
            <RoutingHeader>
                <SenderURI>www.forbes.com/netomat</SenderURI>
                <ReceiverURI>www.netomat.net/forbes</ReceiverURI>
                <ErrorURI>mailto:maciejw@netomat.net</ErrorURI>
                <TimeStamp>20011112192452</TimeStamp>
                <SequenceNumber>00001</SequenceNumber>
            </RoutingHeader>
        </nmlHeader>
        <nmlBody>
            <group>
                <rect color="#ffffff" fillColor="#ffffff" height="450" width="650"/>
                <image noHighlight="true" href="17_pic.jpg" y="56"/>
                <anchor click="jump(@18.nml)">
                        <image noHighlight="true" href="17_arrow.gif" x="239" y="359"/>
                </anchor>
                <anchor click="jump(@8.nml)">
                        <image noHighlight="true" href="17_gnome.jpg" x="16" y="304"/>
                </anchor>
                <anchor click="jump(@4.nml)">
                        <image noHighlight="true" href="17_video.jpg" x="563" y="86"/>
                </anchor>
                <image noHighlight="true" href="logo.gif" x="286" y="11"/>
                <anchor click="jump(@17b.nml)">
                        <text noHighlight="true">alt</text>
                </anchor>
            </group>
        </nmlBody>
    </NML>
```

```
        firstname CDATA #REQUIRED
        lastname CDATA #REQUIRED
>
<!ELEMENT AuthoringEngine EMPTY>
<!ATTLIST AuthoringEngine
        name CDATA #REQUIRED
        version CDATA #REQUIRED
>
<!ELEMENT CATEGORY EMPTY>
<!ATTLIST CATEGORY
        name CDATA #REQUIRED
        value CDATA #REQUIRED
>
<!ELEMENT CommunicationException EMPTY>
<!ATTLIST CommunicationException
        process CDATA #REQUIRED
>
<!ELEMENT CompilingEngine EMPTY>
<!ATTLIST CompilingEngine
        name CDATA #REQUIRED
        version CDATA #REQUIRED
>
<!ELEMENT ContextDef EMPTY>
<!ATTLIST ContextDef
        path CDATA #REQUIRED
        parentRef CDATA #REQUIRED
        insert CDATA #REQUIRED
>
<!ELEMENT Copied (#PCDATA)>
<!ATTLIST Copied
        is CDATA #REQUIRED
        on CDATA #REQUIRED
        by CDATA #REQUIRED
        from CDATA #REQUIRED
        to CDATA #REQUIRED
>
<!ELEMENT Copy EMPTY>
<!ATTLIST Copy
        can CDATA #REQUIRED
        who CDATA #REQUIRED
>
<!ELEMENT DUP EMPTY>
<!ATTLIST DUP
        locator CDATA #REQUIRED
        ranking_order CDATA #REQUIRED
>
<!ELEMENT Date EMPTY>
<!ATTLIST Date
        date CDATA #REQUIRED
>
<!ELEMENT Delete EMPTY>
<!ATTLIST Delete
        can CDATA #REQUIRED
        must CDATA #REQUIRED
        who CDATA #REQUIRED
```

```
        by CDATA #REQUIRED
>
<!ELEMENT Deleted (#PCDATA)>
<!ATTLIST Deleted
        is CDATA #REQUIRED
        by CDATA #REQUIRED
        on CDATA #REQUIRED
>
<!ELEMENT Delivery EMPTY>
<!ATTLIST Delivery
        type CDATA #REQUIRED
>
<!ELEMENT DisplayEngine EMPTY>
<!ATTLIST DisplayEngine
        name CDATA #REQUIRED
        version CDATA #REQUIRED
>
<!ELEMENT Distilled EMPTY>
<!ATTLIST Distilled
        is CDATA #REQUIRED
        from CDATA #REQUIRED
        to CDATA #REQUIRED
>
<!ELEMENT DocumentActions (GetName, SetName, GetContentLanguage,
GetContentLength, GetContentType, GetElement, GetAttribute, PutElement,
PutAttribute, GetLastModified, GetLock, SetLock, GetResourceType,
GetSource, GetCreationdate, CreateMonitor?)>
<!ELEMENT DocumentDescription (#PCDATA)>
<!ATTLIST DocumentDescription
        lang CDATA #REQUIRED
        country CDATA #REQUIRED >
<!ELEMENT CreateMonitor (EgoCentricNetworkMonitor)>

<!ELEMENT DocumentId (#PCDATA)>
<!ELEMENT DocumentLabel (#PCDATA)>
<!ELEMENT DocumentPermissions (Send, Reply, Forward, Publish, Copy,
Refresh, Delete, Optimize, Encode, Encrypt, Persist, Edit)>
<!ELEMENT DocumentReference (DocumentLabel, DocumentId,
DocumentDescription, DocumentState?, DocumentPermissions?, DocumentStatus?,
DocumentActions?)>
<!ELEMENT DocumentState (Copied, Refreshed, Deleted, Optimized, Encoded,
Encrypted, Distilled, Persisted)>
<!ELEMENT DocumentStatus (Lock)>
<!ELEMENT Edit EMPTY>
<!ATTLIST Edit
        can (false | true) #REQUIRED
        who CDATA #REQUIRED
>
<!ELEMENT Edited EMPTY>
<!ATTLIST Edited
        is CDATA #REQUIRED
        by CDATA #REQUIRED
>
```

```
<!ELEMENT EditingEngine EMPTY>
<!ATTLIST EditingEngine
      name CDATA #REQUIRED
      version CDATA #REQUIRED
>
<!ELEMENT EgoCentricNetworkMonitor (Layout, MaxLoaded, MaxDisplayed,
Suggested, Font, TextURI?, TextQueryString?, TextStream?, ImageURI,
ImageQueryString, ImageStream, SoundURI?, SoundQueryString?,
SoundStream?)>
<!ATTLIST netomatics
        version CDATA #IMPLIED
        uri CDATA #IMPLIED
        name CDATA #IMPLIED
        author CDATA #IMPLIED
          date CDATA #IMPLIED
>
<!ELEMENT Encode EMPTY>
<!ATTLIST Encode
      can CDATA #REQUIRED
      must CDATA #REQUIRED
      who CDATA #REQUIRED
      with CDATA #REQUIRED
>
<!ELEMENT Encoded EMPTY>
<!ATTLIST Encoded
      is CDATA #REQUIRED
      included CDATA #REQUIRED
      with CDATA #REQUIRED
>
<!ELEMENT EncodingEngine EMPTY>
<!ATTLIST EncodingEngine
      name CDATA #REQUIRED
      version CDATA #REQUIRED
>
<!ELEMENT Encrypt EMPTY>
<!ATTLIST Encrypt
      can CDATA #REQUIRED
      must CDATA #REQUIRED
      who CDATA #REQUIRED
      with CDATA #REQUIRED
>
<!ELEMENT Encrypted EMPTY>
<!ATTLIST Encrypted
      is CDATA #REQUIRED
      using CDATA #REQUIRED
>
<!ELEMENT Encryption (#PCDATA)>
<!ATTLIST Encryption
      type CDATA #REQUIRED
>
<!ELEMENT ErrorURI (#PCDATA)>
<!ELEMENT Expired EMPTY>
<!ATTLIST Expired
      is CDATA #REQUIRED
>
```

```
<!ELEMENT Font EMPTY>
<!ATTLIST Font
      fontname CDATA #REQUIRED
      fontstyle CDATA #REQUIRED
      fontsize CDATA #REQUIRED
>
<!ELEMENT Forgotten EMPTY>
<!ATTLIST Forgotten
      is CDATA #REQUIRED
      on CDATA #REQUIRED
>
<!ELEMENT Forward EMPTY>
<!ATTLIST Forward
      can CDATA #REQUIRED
      must CDATA #REQUIRED
      who CDATA #REQUIRED
      by CDATA #REQUIRED
      notBefore CDATA #REQUIRED
      notAfter CDATA #REQUIRED
>
<!ELEMENT From (PartyId)>
<!ELEMENT GetAttribute EMPTY>
<!ELEMENT GetContentLanguage EMPTY>
<!ELEMENT GetContentLength EMPTY>
<!ELEMENT GetContentType EMPTY>
<!ELEMENT GetElement EMPTY>
<!ELEMENT GetLastModified EMPTY>
<!ELEMENT GetLock EMPTY>
<!ELEMENT GetName EMPTY>
<!ELEMENT GetResourceType EMPTY>
<!ELEMENT GetSource EMPTY>
<!ELEMENT SearchResultHeader (CATEGORY, TITLE, ABSTRACT, LASTMOD, DUP?)>
<!ATTLIST SearchResultHeader
      ranking_order NMTOKEN #REQUIRED
      languageCode CDATA #REQUIRED
      contryCode CDATA #REQUIRED
>
<!ELEMENT Host EMPTY>
<!ATTLIST Host
      hostURL CDATA #REQUIRED
      hostName CDATA #REQUIRED
>
<!ELEMENT ImageQueryString EMPTY>
<!ATTLIST ImageQueryString
      query CDATA #REQUIRED
>
<!ELEMENT ImageStream EMPTY>
<!ATTLIST ImageStream
      starts_with CDATA #REQUIRED
      ends_with CDATA #REQUIRED
      trim_to CDATA #REQUIRED
      trim_from CDATA #REQUIRED
>
<!ELEMENT ImageURI EMPTY>
<!ATTLIST ImageURI
```

```
        uri CDATA #REQUIRED
>
<!ELEMENT LASTMOD (#PCDATA)>
<!ELEMENT Lock EMPTY>
<!ATTLIST Lock
        exclusive CDATA #REQUIRED
        sharedBy CDATA #REQUIRED
        universal CDATA #REQUIRED
        active CDATA #REQUIRED
        href CDATA #REQUIRED
>
<!ELEMENT MaxDisplayed EMPTY>
<!ATTLIST MaxDisplayed
        lines NMTOKEN #REQUIRED
        pictures NMTOKEN #REQUIRED
        sounds NMTOKEN #REQUIRED
>
<!ELEMENT MaxLoaded EMPTY>
<!ATTLIST MaxLoaded
        lines NMTOKEN #REQUIRED
        pictures NMTOKEN #REQUIRED
        sounds NMTOKEN #REQUIRED
>
<!ELEMENT MessageActionStatus (#PCDATA)>
<!ATTLIST MessageActionStatus
        wasSent CDATA #REQUIRED
        wasReplied CDATA #REQUIRED
        wasRepliedNumOfTimes CDATA #REQUIRED
        wasForwarded CDATA #REQUIRED
        wasForwardedNumOfTimes CDATA #REQUIRED
>
<!ELEMENT MessageData (MessageId, TimeStamp, Encryption?, Delivery?)>
<!ELEMENT MessageHeader (From, To, MessageData, MessageActionStatus,
MessageMode)>
<!ELEMENT MessageId (#PCDATA)>
<!ELEMENT MessageMode (#PCDATA)>
<!ATTLIST MessageMode
        prefered CDATA #REQUIRED
        mandatory CDATA #REQUIRED
        synchronous CDATA #REQUIRED
        asynchronous CDATA #REQUIRED
>
<!ELEMENT nmlObjectDistilled EMPTY>
<!ATTLIST nmlObjectDistilled
        id NMTOKEN #IMPLIED
        type CDATA #IMPLIED
        name CDATA #REQUIRED
        value NMTOKENS #IMPLIED
        from CDATA #IMPLIED
        to CDATA #IMPLIED
        alt CDATA #IMPLIED
        url CDATA #IMPLIED
        altURL CDATA #IMPLIED
>
<!ELEMENT Name EMPTY>
```

```
<!ATTLIST Name
      title CDATA #REQUIRED
>
<!ELEMENT NetworkingEngine EMPTY>
<!ATTLIST NetworkingEngine
      name CDATA #REQUIRED
      version CDATA #REQUIRED
>
<!ELEMENT OperationNotSupportedException EMPTY>
<!ATTLIST OperationNotSupportedException
      process (false | true) #REQUIRED
>
<!ELEMENT Optimize EMPTY>
<!ATTLIST Optimize
      can CDATA #REQUIRED
      must CDATA #REQUIRED
      who CDATA #REQUIRED
>
<!ELEMENT Optimized EMPTY>
<!ATTLIST Optimized
      is CDATA #REQUIRED
      by CDATA #REQUIRED
>
<!ELEMENT ParsingEngine EMPTY>
<!ATTLIST ParsingEngine
      name CDATA #REQUIRED
      version CDATA #REQUIRED
>
<!ELEMENT PartyId (#PCDATA)>
<!ELEMENT Persist EMPTY>
<!ATTLIST Persist
      can CDATA #REQUIRED
      must CDATA #REQUIRED
      who CDATA #REQUIRED
      imediately CDATA #REQUIRED
      forgetBy CDATA #REQUIRED
      expireOn CDATA #REQUIRED
>
<!ELEMENT Persisted (Forgotten, Expired, Edited)>
<!ATTLIST Persisted
      is CDATA #REQUIRED
      by CDATA #REQUIRED
>
<!ELEMENT PersitenceEngine EMPTY>
<!ATTLIST PersitenceEngine
      name CDATA #REQUIRED
      version CDATA #REQUIRED
>
<!ELEMENT Publish EMPTY>
<!ATTLIST Publish
      can CDATA #REQUIRED
      who CDATA #REQUIRED
      notBefore CDATA #REQUIRED
      notAfter CDATA #REQUIRED
>
```

```
<!ELEMENT PutAttribute EMPTY>
<!ELEMENT PutElement EMPTY>
<!ELEMENT ReceiverURI (#PCDATA)>
<!ELEMENT Refresh EMPTY>
<!ATTLIST Refresh
      can CDATA #REQUIRED
      must CDATA #REQUIRED
      interval CDATA #REQUIRED
      how CDATA #REQUIRED
      who CDATA #REQUIRED
>
<!ELEMENT Refreshed (#PCDATA)>
<!ATTLIST Refreshed
      is CDATA #REQUIRED
      on CDATA #REQUIRED
      synchronized CDATA #REQUIRED
>
<!ELEMENT Reply EMPTY>
<!ATTLIST Reply
      can CDATA #REQUIRED
      must CDATA #REQUIRED
      who CDATA #REQUIRED
      by CDATA #REQUIRED
>
<!ELEMENT RouteInfo (#PCDATA)>
<!ELEMENT RoutingHeader (SenderURI?, ReceiverURI?, ErrorURI?, TimeStamp?,
SequenceNumber?, RouteInfo?)>
<!ELEMENT SchemaViolationException EMPTY>
<!ATTLIST SchemaViolationException
      process (true | false) #REQUIRED
>
<!ELEMENT SearchEngine EMPTY>
<!ATTLIST SearchEngine
      name CDATA #REQUIRED
      version CDATA #REQUIRED
>
<!ELEMENT Send EMPTY>
<!ATTLIST Send
      can CDATA #REQUIRED
      who CDATA #REQUIRED
>
<!ELEMENT SenderURI (#PCDATA)>
<!ELEMENT SequenceNumber (#PCDATA)>
<!ELEMENT Service (ServiceCondition | ServiceFormat | ServiceFailure |
ServiceQueryString | ServiceStream | ServiceRange)+>
<!ATTLIST Service
      protocol CDATA #IMPLIED
      method CDATA #IMPLIED
      uri CDATA #IMPLIED
      serviceName CDATA #IMPLIED
      objectModel CDATA #IMPLIED
>
<!ELEMENT ServiceBusyException EMPTY>
<!ATTLIST ServiceBusyException
      retry NMTOKEN #REQUIRED
```

```
        wait NMTOKEN #REQUIRED
>
<!ELEMENT ServiceCondition EMPTY>
<!ATTLIST ServiceCondition
        timeout NMTOKEN #REQUIRED
        timeLimit NMTOKEN #REQUIRED
        maxSize NMTOKEN #REQUIRED
>
<!ELEMENT ServiceFailure (ServiceUnavailableException,
ServiceBusyException, TimeLimitExceededException,
SizeLimitExceededException, SchemaViolationException,
CommunicationException, OperationNotSupportedException)>
<!ELEMENT ServiceFormat EMPTY>
<!ATTLIST ServiceFormat
        type CDATA #REQUIRED
>
<!ELEMENT ServiceQueryString EMPTY>
<!ATTLIST ServiceQueryString
        query CDATA #REQUIRED
        interface CDATA #IMPLIED
>
<!ELEMENT ServiceRange EMPTY>
<!ATTLIST ServiceRange
        start CDATA #REQUIRED
        end CDATA #REQUIRED
>
<!ELEMENT ServiceStream EMPTY>
<!ATTLIST ServiceStream
        starts_with CDATA #REQUIRED
        ends_with CDATA #REQUIRED
        trim_to CDATA #REQUIRED
        trim_from CDATA #REQUIRED
>
<!ELEMENT ServiceUnavailableException EMPTY>
<!ATTLIST ServiceUnavailableException
        uri CDATA #REQUIRED
>
<!ELEMENT SetLock EMPTY>
<!ELEMENT SetName EMPTY>
<!ELEMENT SizeLimitExceededException EMPTY>
<!ATTLIST SizeLimitExceededException
        process (true | false) #REQUIRED
>
<!ELEMENT SoundEngine EMPTY>
<!ATTLIST SoundEngine
        name CDATA #REQUIRED
        version CDATA #REQUIRED
>
<!ELEMENT SoundQueryString EMPTY>
<!ATTLIST SoundQueryString
        query CDATA #REQUIRED
>
<!ELEMENT SoundStream EMPTY>
<!ATTLIST SoundStream
        starts_with CDATA #REQUIRED
```

```
                ends_with CDATA #REQUIRED
                trim_to CDATA #REQUIRED
                trim_from CDATA #REQUIRED
        >
        <!ELEMENT SoundURI EMPTY>
        <!ATTLIST SoundURI
                uri CDATA #REQUIRED
        >
        <!ELEMENT Suggested EMPTY>
        <!ATTLIST Suggested
                input CDATA #REQUIRED
        >
        <!ELEMENT TITLE (#PCDATA)>
        <!ATTLIST TITLE
                locator CDATA #REQUIRED
        >
        <!ELEMENT TextQueryString EMPTY>
        <!ATTLIST TextQueryString
                query CDATA #REQUIRED
        >
        <!ELEMENT TextStream EMPTY>
        <!ATTLIST TextStream
                starts_with CDATA #REQUIRED
                ends_with CDATA #REQUIRED
                trim_to CDATA #REQUIRED
                trim_from CDATA #REQUIRED
        >
        <!ELEMENT TextURI EMPTY>
        <!ATTLIST TextURI
                uri CDATA #REQUIRED
        >
        <!ELEMENT TimeLimitExceededException EMPTY>
        <!ATTLIST TimeLimitExceededException
                process (String | Text | true) #REQUIRED
        >
        <!ELEMENT TimeStamp (#PCDATA)>
        <!ELEMENT To (PartyId)>
        <!ELEMENT TransformationEngine EMPTY>
        <!ATTLIST TransformationEngine
                name CDATA #REQUIRED
                version CDATA #REQUIRED
        >
        <!ELEMENT Version EMPTY>
        <!ATTLIST Version
                id   NMTOKEN #IMPLIED
                compatible NMTOKEN #IMPLIED
                description CDATA #IMPLIED
                size NMTOKEN #IMPLIED
                number CDATA #IMPLIED
        >
        <!ELEMENT nmlObjetModel EMPTY>
        <!ATTLIST nmlObjetModel
                name CDATA #REQUIRED
                version CDATA #REQUIRED
        >
```

```
<!ELEMENT a (polyline | image | movep | text)>
<!ATTLIST a
        rollover CDATA #IMPLIED
        click CDATA #IMPLIED
        wombat CDATA #IMPLIED
        x CDATA #IMPLIED
        y CDATA #IMPLIED
>
<!ELEMENT anchor (image?, rect?, text*, moveOval?, image?, moveLine?)>
<!ATTLIST anchor
        click CDATA #IMPLIED
        rollover CDATA #IMPLIED
        relative CDATA #IMPLIED
>
<!ELEMENT audio EMPTY>
<!ATTLIST audio
        src (map_narration.rm | video_narration_audio_only.rm) #REQUIRED
        clip-begin CDATA #IMPLIED
        dur CDATA #IMPLIED
>
<!ELEMENT cels EMPTY>
<!ATTLIST cels
        href NMTOKEN #REQUIRED
        cels CDATA #IMPLIED
        period NMTOKEN #REQUIRED
        x NMTOKEN #IMPLIED
        y NMTOKEN #IMPLIED
        cells CDATA #IMPLIED
        backwards CDATA #IMPLIED
>
<!ELEMENT choice EMPTY>
<!ATTLIST choice
        x CDATA #REQUIRED
        y CDATA #REQUIRED
        name CDATA #REQUIRED
        items CDATA #REQUIRED
        menu CDATA #REQUIRED
        defaultName CDATA #REQUIRED
>
<!ELEMENT clock EMPTY>
<!ATTLIST clock
        timeZone (ECT | EST | JST | PST) #IMPLIED
        font CDATA #IMPLIED
        x NMTOKEN #IMPLIED
        y NMTOKEN #IMPLIED
        color CDATA #IMPLIED
        target CDATA #IMPLIED
>
<!ELEMENT color EMPTY>
<!ATTLIST color
        value CDATA #REQUIRED
>
<!ELEMENT countdown EMPTY>
<!ATTLIST countdown
        y   NMTOKEN #REQUIRED
```

```
        target CDATA #REQUIRED
>
<!ELEMENT drag (image | scale | movep | countdown | movel | moveOval |
movePoly)>
<!ELEMENT draggable (text)>
<!ELEMENT drawable EMPTY>
<!ATTLIST drawable
        height NMTOKEN #REQUIRED
        width NMTOKEN #REQUIRED
        x NMTOKEN #REQUIRED
        y NMTOKEN #REQUIRED
        penColor CDATA #REQUIRED
        penWidth CDATA #IMPLIED
        penHeight CDATA #IMPLIED
>
<!ELEMENT dynamic EMPTY>
<!ATTLIST dynamic
        source CDATA #REQUIRED
>
<!ELEMENT edit (drag+)>
<!ATTLIST edit
        who CDATA #REQUIRED
        start CDATA #REQUIRED
        end CDATA #REQUIRED
>
<!ELEMENT font EMPTY>
<!ATTLIST font
        name CDATA #IMPLIED
        size  NMTOKEN #REQUIRED
        type CDATA #IMPLIED
        style CDATA #IMPLIED
>
<!ELEMENT GetCreationdate EMPTY>
<!ELEMENT group (image | moveLine | anchor | scroll | group | text+ | rect
| cels | movePoly | clock | drawable | drag | scale | polyline | mouser |
textf | moveOval | wander | edit | textField | movel | choice | a)+>
<!ATTLIST group
        id NMTOKEN #IMPLIED
        x NMTOKEN #IMPLIED
        y NMTOKEN #IMPLIED
        editable CDATA #IMPLIED
        writeTo CDATA #IMPLIED
        update CDATA #IMPLIED
        writeLoc CDATA #IMPLIED
>
<!ELEMENT image (#PCDATA | link)*>
<!ATTLIST image
        href CDATA #IMPLIED
        x NMTOKEN #IMPLIED
        y NMTOKEN #IMPLIED
        noHighlight (false | true) #IMPLIED
        permeable (1 | Text | true) #IMPLIED
        width (123 | 20 | 47 | 60) #IMPLIED
        height (20 | 30 | 321 | 60) #IMPLIED
        title CDATA #IMPLIED
```

```
        highlightColor CDATA #IMPLIED
        src CDATA #IMPLIED
        draggable CDATA #IMPLIED
        dy NMTOKEN #IMPLIED
        dx NMTOKEN #IMPLIED
        id CDATA #IMPLIED
        type (moving | still) #IMPLIED
        created CDATA #IMPLIED
        translate CDATA #IMPLIED
        scale CDATA #IMPLIED
>
<!ELEMENT img EMPTY>
<!ATTLIST img
        src CDATA #REQUIRED
        region CDATA #REQUIRED
        fill CDATA #REQUIRED
        system-bitrate NMTOKEN #IMPLIED
>
<!ELEMENT link (image?)>
<!ATTLIST link
        type (forward | hyper | popup | scene | url) #REQUIRED
        value CDATA #IMPLIED
        src CDATA #IMPLIED
        href CDATA #IMPLIED
        created CDATA #IMPLIED
>
<!ELEMENT mouser (image+)>
<!ATTLIST mouser
        strength CDATA #REQUIRED
        minWander CDATA #REQUIRED
        pixWander CDATA #REQUIRED
        wander CDATA #REQUIRED
        breakpoint CDATA #REQUIRED
>
<!ELEMENT moveLine (image?, anchor?, moveOval*, rectangle?, oval?, text?, rect?)>
<!ATTLIST moveLine
        from CDATA #IMPLIED
        to CDATA #IMPLIED
        relative (false | true) #IMPLIED
        duration NMTOKEN #IMPLIED
        period NMTOKEN #IMPLIED
        loops CDATA #IMPLIED
        reverse (false | true) #IMPLIED
>
<!ELEMENT moveOval (image)>
<!ATTLIST moveOval
        radius NMTOKEN #REQUIRED
        period NMTOKEN #IMPLIED
        angle NMTOKEN #IMPLIED
        clockwise CDATA #IMPLIED
        aspect NMTOKEN #IMPLIED
        center CDATA #IMPLIED
        relative CDATA #IMPLIED
        duration NMTOKEN #IMPLIED
```

```
        x CDATA #IMPLIED
        y CDATA #IMPLIED
>
<!ELEMENT movePoly (anchor?, image?, polyline?, oval?, text?, rect?)>
<!ATTLIST movePoly
        points CDATA #REQUIRED
        period NMTOKEN #IMPLIED
        times CDATA #IMPLIED
        relative (false | true) #IMPLIED
        closed CDATA #IMPLIED
        reverse CDATA #IMPLIED
        duration NMTOKEN #IMPLIED
        loops CDATA #IMPLIED
>
<!ELEMENT movel (clock?, movel?, countdown?, text?, cels?, image?,
draggable?)>
<!ATTLIST movel
        from CDATA #IMPLIED
        to CDATA #REQUIRED
        reverse CDATA #IMPLIED
        period NMTOKEN #IMPLIED
        duration NMTOKEN #IMPLIED
        loops CDATA #IMPLIED
>
<!ELEMENT movep (cels | polyline+ | group | countdown)>
<!ATTLIST movep
        points CDATA #REQUIRED
        period NMTOKEN #IMPLIED
        duration NMTOKEN #IMPLIED
        reverse CDATA #IMPLIED
>
<!ELEMENT nml (nmlHeader, nmlBody)>
<!ATTLIST nml
        version NMTOKEN #IMPLIED
        created CDATA #IMPLIED
>
<!ELEMENT Camera (rdf:Bag)>
<!ELEMENT NMLObj (Pan, Zoom)>
<!ATTLIST NMLObj
        about CDATA #REQUIRED
>
<!ELEMENT Pan EMPTY>
<!ATTLIST Pan
        obj NMTOKENS #REQUIRED
>

<!ELEMENT Players (rdf:Bag)>
<!ELEMENT Scenegraph (NMLObj)>
<!ELEMENT Track EMPTY>
<!ATTLIST Track
        resource CDATA #REQUIRED
>
<!ELEMENT Zoom (#PCDATA)>
<!ELEMENT nmlBody (scene* | nmlFrag*)>
<!ELEMENT nmlFrag (ContextDef, group)>
```

```
<!ATTLIST nmlFrag
      id CDATA #REQUIRED
>
<!ELEMENT nmlHeader ( (nmlObjectDistilled+, DocumentReference?,
MessageHeader?, RoutingHeader?, Version?, Host?, Name?, Author?, Date?,
nmlObjetModel?, Service*, rdf:RDF?, SearchResultHeader*, netomatics) |
nmlHeaderRef)>
<!ATTLIST nmlHeader
      messageType CDATA #IMPLIED
>
<!ELEMENT netomatics (NetworkingEngine?, DisplayEngine?, SoundEngine?,
TransformationEngine?, EditingEngine?, EncodingEngine?, ParsingEngine?,
CompilingEngine?, PersitenceEngine?, nmlSearchEngine?, SearchEngine?,
AuthoringEngine?)>
<!ATTLIST netomatics
        version CDATA #IMPLIED
        dateCreated CDATA #IMPLIED
        uri CDATA #IMPLIED
        name CDATA #IMPLIED
        author CDATA #IMPLIED
>

<!ELEMENT nmlHeaderRef EMPTY>
<!ATTLIST nmlHeaderRef
      uri CDATA #REQUIRED
>
<!ELEMENT nmlSearchEngine EMPTY>
<!ATTLIST nmlSearchEngine
      name CDATA #REQUIRED
      version CDATA #REQUIRED
>
<!ELEMENT oval EMPTY>
<!ATTLIST oval
      color CDATA #REQUIRED
      center CDATA #IMPLIED
      width NMTOKEN #REQUIRED
      height NMTOKEN #REQUIRED
      filled CDATA #IMPLIED
      x NMTOKEN #IMPLIED
>
<!ELEMENT par (text?, switch?, seq?, audio?, img?)>
<!ELEMENT polyline (color?)>
<!ATTLIST polyline
      thickness CDATA #IMPLIED
      color CDATA #IMPLIED
      points CDATA #REQUIRED
      closed CDATA #IMPLIED
      permeable CDATA #IMPLIED
      pen-color CDATA #IMPLIED
      pen-width CDATA #IMPLIED
      created CDATA #IMPLIED
>
<!ELEMENT rdf:Bag (rdf:li+)>
<!ELEMENT rdf:Description (Scenegraph?, Players?, Track?, Camera?)>
<!ATTLIST rdf:Description
```

```
        about CDATA #REQUIRED
>
<!ELEMENT rdf:RDF (#PCDATA | rdf:Description)*>
<!ATTLIST rdf:RDF
        xmlns:rdf CDATA #REQUIRED
        xmlns:nml CDATA #REQUIRED
>
<!ELEMENT rdf:li EMPTY>
<!ATTLIST rdf:li
        resource CDATA #REQUIRED
>
<!ELEMENT rect EMPTY>
<!ATTLIST rect
        color CDATA #IMPLIED
        fillColor CDATA #IMPLIED
        height NMTOKEN #REQUIRED
        width  NMTOKEN #REQUIRED
        x NMTOKEN #IMPLIED
        y NMTOKEN #IMPLIED
        highlightColor CDATA #IMPLIED
        permeable CDATA #IMPLIED
>
<!ELEMENT rectangle EMPTY>
<!ATTLIST rectangle
        color CDATA #REQUIRED
        center CDATA #REQUIRED
        width CDATA #REQUIRED
        height CDATA #REQUIRED
        filled CDATA #REQUIRED
>
<!ELEMENT Layout EMPTY>
<!ATTLIST Layout
        id (full | title | toc) #REQUIRED
        left NMTOKEN #REQUIRED
        top NMTOKEN #REQUIRED
        width NMTOKEN #REQUIRED
        height NMTOKEN #REQUIRED
        z-index NMTOKEN #IMPLIED
        background-color CDATA #IMPLIED
>
<!ELEMENT scale (moveLine | movep | movel | anchor | group | drag |
polyline | image)>
<!ATTLIST scale
        from NMTOKEN #IMPLIED
        to NMTOKEN #REQUIRED
        period CDATA #IMPLIED
        loops CDATA #IMPLIED
        duration NMTOKEN #IMPLIED
        reverse CDATA #IMPLIED
>
<!ELEMENT scene (group)*>
<!ATTLIST scene
        size CDATA #REQUIRED
        base CDATA #IMPLIED
        created CDATA #REQUIRED
```

```
        renderer CDATA #IMPLIED
        type CDATA #IMPLIED
        fgimg CDATA #IMPLIED
        bgimg CDATA #IMPLIED
>
<!ELEMENT scroll (image+ | oval+ | text+ | anchor+)>
<!ATTLIST scroll
        vertical (false | true) #IMPLIED
        increasing (false | true) #IMPLIED
        startLoop NMTOKEN #REQUIRED
        start NMTOKEN #REQUIRED
        end NMTOKEN #REQUIRED
        endLoop NMTOKEN #REQUIRED
        duration NMTOKEN #REQUIRED
>
<!ELEMENT seq (text | par | video | audio)+>
<!ELEMENT switch (img+)>
<!ELEMENT text (#PCDATA | color | font | link | dynamic)*>
<!ATTLIST text
        noHighlight CDATA #IMPLIED
        x  NMTOKEN #IMPLIED
        y NMTOKEN #IMPLIED
        color CDATA #IMPLIED
        font CDATA #IMPLIED
        text CDATA #IMPLIED
        align (center | left) #IMPLIED
        highlightColor CDATA #IMPLIED
        javatype CDATA #IMPLIED
        dx CDATA #IMPLIED
        dy CDATA #IMPLIED
        src CDATA #IMPLIED
        region (title | toc) #IMPLIED
        dur CDATA #IMPLIED
>
<!ELEMENT textField EMPTY>
<!ATTLIST textField
        x CDATA #REQUIRED
        y CDATA #REQUIRED
        name CDATA #IMPLIED
        charHeight CDATA #IMPLIED
>
<!ELEMENT textf EMPTY>
<!ATTLIST textf
        charHeight CDATA #REQUIRED
        charWidth CDATA #REQUIRED
        x NMTOKEN #REQUIRED
        y NMTOKEN #REQUIRED
>
<!ELEMENT video EMPTY>
<!ATTLIST video
        src CDATA #REQUIRED
        region CDATA #REQUIRED
        dur CDATA #IMPLIED
        clip-begin CDATA #IMPLIED
>
```

```
<!ELEMENT wander (image+, a)>
<!ATTLIST wander
        bounce CDATA #REQUIRED
        minx CDATA #REQUIRED
        miny CDATA #REQUIRED
        maxy CDATA #REQUIRED
        wander CDATA #REQUIRED
>
```

Accordingly, having presented the present invention in view of the above described embodiments, various alterations, modifications and improvements are intended to be within the scope and spirit of the invention. The foregoing description is by way of example only and is not intended as limiting. The invention's limit is defined only in the following claims and the equivalents thereto.

What is claimed is:

1. A method of communicating information between parties comprising:
    automatically creating a content-dependent just-in-time application file for an electronic authored work based on the content assembled together in the authored work by an author, wherein the step of automatically creating includes:
        automatically generating a grammar scheme for the electronic authored work based only on the content of the authored work specified by the author;
        processing the grammar scheme into source code for the electronic authored work;
        compiling the source code into object code for the electronic authored work; and
        linking an object code library;
    and wherein the file includes code for:
        information contained in the authored work, wherein at least a portion of the information may be stored remotely from a networked device processing the just-in-time application file for presenting the authored work,
        creating and/or invoking at least one first application for presenting the content of the authored work on a networked device,
    disseminating the file through a computer network; and
    forwarding the disseminated file to a distribution channel for presenting the authored work to a recipient on a networked device, wherein upon receiving the file on the networked device, the just-in-time application file is processed creating the at least one first application for presenting the authored work based on the content of the authored work.

2. The method of claim 1, wherein prior to automatically creating the just-in-time application file, the authored work is formatted by the author for displaying the authored work in a predetermined manner upon receipt on the networked device, and wherein the file includes code related to the displaying of the formatter authored work in the predetermined manner based on the content of the authored work.

3. The method according to claim 1, wherein the distribution channel includes at least one of email, internet page, wireless device, electronic advertisement and instant messaging application.

4. The method according to claim 1, wherein prior to automatically creating the just-in-time application file, the method further includes receiving information of the authored work from the author for automatically creating the content based just-in-time application file.

5. The method according to claim 1, wherein the file also includes code for creating and/or invoking at least one second application being presented with the authored work on the networked device as specified by the author.

6. The method according to claim 5, wherein the second application comprises at least one of an instant messaging application, an internet search application and an authoring application for editing the authored work or creating a new electronic authored work.

7. The method according to claim 6, wherein an annotation made to the authored work after the authored work is presented to the recipient are automatically reflected upon the authored work being presented subsequent to the annotation.

8. The method according to claim 1, wherein at least a portion of information presented in the authored work is provided real-time to the networked device.

9. The method according to claim 1, wherein the authored work includes image information and the at least one first application includes an image viewer.

10. The method according to claim 1, wherein the authored work includes video information and the at least one first application includes a video viewer.

11. The method according to claim 1, wherein the file includes code for an external reference for presenting at least some of the information on the networked device.

12. The method according to claim 1, wherein the distribution channel is email and the file includes code for creating a second application comprising an authoring application for modifying or creating an authored work.

13. The method according to claim 1, wherein one or more rules for distribution of the file are specified by an author of the authored work and included in the file.

14. The method according to claim 13, wherein the rules include at least one of: a number of times the file is accessed, the amount of time file may be accessed, a number of email addresses which may access the file, and specific email addresses which may or may not access the file.

15. The method according to claim 13, wherein the rules include giving full access to the file to all by creating a published work.

16. The method according to claim 15, wherein upon publishing, the authored work is available via a web page for viewing over the internet.

17. The method according to claim 1, wherein upon the authored work being presented at the distribution channel, a reply is automatically sent to the author of the authored work indicating that the authored work has been presented.

18. The method according to claim 1, wherein the code further includes code related to means for transporting the just-in-time application file over a computer network, controlling editing rights of the authored work, and the presentation of the authored work on the networked device.

19. A computer readable medium having computer instructions provided thereon for enabling a computer to perform a method of communicating information between parties, the method comprising:
    automatically creating a content-dependent just-in-time application file for an electronic authored work based on the content assembled together in an authored work created by the author,
    wherein the step of automatically creating includes:
        automatically generating a grammar scheme for the electronic authored work based only on the content of the authored work specified by the author;
        processing the grammar scheme into source code for the electronic authored work;
        compiling the source code into object code for the electronic authored work; and
        linking an object code library;
    wherein the file includes code for:
        information contained in the authored work, wherein at least a portion of the information may be stored remotely from a networked device processing the just-in-time application file for presenting the authored work, creating and/or invoking at least one first application for presenting the authored work on a networked device, disseminating the file through a computer network; and forwarding the disseminated file to a distribution channel for presenting the authored work to a recipient on a networked device, wherein upon receiving the file on a networked device, the just-in-time application file is processed creating the at least one application for presenting the authored work based on the content of the authored work.

20. The computer readable medium according to claim 19, wherein the code further includes code related to means for transporting the just-in-time application file over a computer network, controlling editing rights of the authored work, and the presentation of the authored work on the networked device.

21. An application program operable on a computer system for performing a method of communicating information between parties, the method comprising:

automatically creating a content-dependent just-in-time application file for an electronic authored work based on the content assembled together in an authored work created by the author, wherein the step of automatically creating includes:

automatically generating a grammar scheme for the electronic authored work based only on the content of the authored work specified by the author;

processing the grammar scheme into source code for the electronic authored work;

compiling the source code into object code for the electronic authored work; and linking an object code library;

wherein the file includes code for:

information contained in the authored work, wherein at least a portion of the information may be stored remotely from a networked device processing the just-in-time application file for presenting the authored work, creating and/or invoking at least one first application for presenting the authored work on a networked device, disseminating the file through a computer network; and forwarding the disseminated file to a distribution channel for presenting the authored work to a recipient on a networked device, wherein upon receiving the file on a networked device, the just-in-time application file is processed creating the at least one application for presenting the authored work based on the content of the authored work.

22. The application program according to claim 21, wherein the code further includes code related to means for transporting the just-in-time application file over a computer network, controlling editing of the authored work, and the presentation of the authored work on the networked device.

23. An apparatus for communicating information comprising:

a server for:

receiving information of an electronic authored work from a client computer;

automatically creating a content-dependent just-in-time application file for the electronic authored work based on the content assembled together in an authored work by the author;

disseminating the file through a computer network either by storing the file, uploading the file to a second server or by making the file available through peer to peer networking; and forwarding the disseminated file to a distribution channel for presenting the authored work on a networked device, wherein upon receiving the file on a networked device, the just-in-time application file is processed creating the at least one application for presenting the authored work based on the content of the authored work, wherein the step of automatically creating includes:

automatically penetrating a grammar scheme for the electronic authored work based only on the content of the authored work specified by the author;

processing the grammar scheme into source code for the electronic authored work;

compiling the source code into object code for the electronic authored work; and linking an object code library;

wherein the file includes compiled code for:

information contained in the authored work, wherein at least a portion of the information may be stored remotely from a networked device processing the just-in-time application file for presenting the authored work, code for creating and/or invoking at least one first application for presenting the authored work on a networked device based on the content of the authored work.

24. The apparatus according to claim 23, wherein the file of compiled code includes code related to means for transporting the just-in-time application file over a computer network, controlling editing rights of the authored work, and the presentation of the authored work on the networked device.

* * * * *